(12) United States Patent
Edlund et al.

(10) Patent No.: US 6,494,937 B1
(45) Date of Patent: Dec. 17, 2002

(54) HYDROGEN PURIFICATION DEVICES, COMPONENTS AND FUEL PROCESSING SYSTEMS CONTAINING THE SAME

(75) Inventors: David J. Edlund, Bend, OR (US); Charles R. Hill, Bend, OR (US); William A. Pledger, Sisters, OR (US); R. Todd Studebaker, Bend, OR (US)

(73) Assignee: IdaTech, LLC, Bend, OR (US)

( * ) Notice: Subject to any disclaimer, the term of this patent is extended or adjusted under 35 U.S.C. 154(b) by 0 days.

(21) Appl. No.: 09/967,172

(22) Filed: Sep. 27, 2001

(51) Int. Cl.$^7$ .............................................. B01D 53/22
(52) U.S. Cl. ............................. 96/4; 95/55; 96/9; 96/11
(58) Field of Search ............................. 95/55, 56; 96/4, 96/7, 9, 11

(56) References Cited

U.S. PATENT DOCUMENTS

| | | |
|---|---|---|
| 3,144,312 A | 8/1964 | Mertens |
| 3,208,198 A * | 9/1965 | Rubin .............................. 95/56 |
| 3,336,730 A | 8/1967 | McBride et al. |
| 3,338,681 A | 8/1967 | Kordesch |
| 3,350,176 A | 10/1967 | Green et al. |
| 3,469,944 A | 9/1969 | Bocard et al. |
| 3,534,531 A * | 10/1970 | Eguchi et al. .................... 96/7 |
| 3,787,038 A | 1/1974 | Tesner et al. |
| 3,920,416 A | 11/1975 | Houseman |
| 3,955,941 A | 5/1976 | Houseman et al. |
| 3,982,910 A | 9/1976 | Houseman et al. |
| 4,084,934 A | 4/1978 | Kumazawa |
| 4,098,959 A | 7/1978 | Fanciullo |
| 4,134,739 A | 1/1979 | Gulden et al. |
| 4,302,177 A | 11/1981 | Fankhanel et al. |
| 4,430,304 A | 2/1984 | Spurrier et al. |
| 4,473,622 A | 9/1984 | Chludzinski et al. |
| 4,504,447 A | 3/1985 | Spurrier et al. |
| 4,533,607 A | 8/1985 | Sederquist |
| 4,567,857 A | 2/1986 | Houseman et al. |
| 4,613,436 A * | 9/1986 | Wight et al. .................. 96/7 X |

(List continued on next page.)

FOREIGN PATENT DOCUMENTS

| | | |
|---|---|---|
| EP | 1065741 A2 | 1/2001 |
| JP | 57-145276 | 9/1982 |
| JP | 4-338101 | 11/1992 |
| WO | WO 99/65097 | 12/1999 |
| WO | WO 00/27507 | 5/2000 |
| WO | WO 01/03086 | 1/2001 |
| WO | WO 01/28662 | 4/2001 |
| WO | WO 01/83086 | 11/2001 |

OTHER PUBLICATIONS

US 6,340,380, 1/2002, Frost et al. (withdrawn)*
English abstract of Japanese Patent No. 513230, 1993.
English abstract of Japanese Patent No. 514790, 1993.
English abstract of Japanese Patent No. 710910, 1995.
English abstract of Japanese Patent No. 828793, 1996.
English abstract of Japanese Patent No. 4–338101.
English abstract of Great Britain Patent No. 2,305,186.

*Primary Examiner*—Robert H. Spitzer
(74) *Attorney, Agent, or Firm*—Kolisch Hartwell, P.C.

(57) ABSTRACT

A hydrogen purification device, components thereof, and fuel processors and fuel cell system containing the same. The hydrogen purification devices include an enclosure that contains a separation assembly adapted to receive a mixed gas stream containing hydrogen gas and to produce a stream that contains pure or at least substantially pure hydrogen gas therefrom. The separation assembly may include at least one hydrogen-permeable and/or hydrogen-selective membrane. In some embodiments, the enclosure includes a pair of end plates and a shell extending generally between the end plates. In some embodiments, the enclosure includes a shell that is integrated with at least one of the end plates. In some embodiments, at least one of the end plates includes a deflection and/or stress abatement structure. In some embodiments, the device includes components formed from materials having similar or the same coefficients of thermal expansion.

94 Claims, 12 Drawing Sheets

U.S. PATENT DOCUMENTS

| | | | |
|---|---|---|---|
| 4,657,828 A | | 4/1987 | Tajima |
| 4,659,634 A | | 4/1987 | Struthers |
| 4,699,637 A | | 10/1987 | Iniotakis et al. |
| 4,788,004 A | | 11/1988 | Pinto et al. |
| 4,810,485 A | * | 3/1989 | Marianowski et al. ...... 95/56 X |
| 4,838,897 A | | 6/1989 | Amano et al. |
| 4,849,187 A | | 7/1989 | Uozu et al. |
| 4,981,676 A | | 1/1991 | Minet et al. |
| 5,226,928 A | | 7/1993 | Makabe et al. |
| 5,229,102 A | | 7/1993 | Minet et al. |
| 5,376,167 A | * | 12/1994 | Broutin et al. .............. 95/56 X |
| 5,401,589 A | | 3/1995 | Palmer et al. |
| RE35,002 E | | 7/1995 | Matsubara et al. |
| 5,432,710 A | | 7/1995 | Ishimaru et al. |
| 5,500,122 A | * | 3/1996 | Schwartz ................... 96/11 X |
| 5,516,344 A | | 5/1996 | Corrigan |
| 5,518,530 A | * | 5/1996 | Sakai et al. ................. 95/56 X |
| 5,520,807 A | * | 5/1996 | Myrna et al. ............... 96/11 X |
| 5,536,405 A | * | 7/1996 | Myrna et al. ............... 96/11 X |
| 5,637,414 A | | 6/1997 | Inoue et al. |
| 5,639,431 A | | 6/1997 | Shirasaki et al. |
| 5,811,065 A | | 9/1998 | Sterenberg |
| 5,833,723 A | | 11/1998 | Kuwabara et al. |
| 5,861,137 A | | 1/1999 | Edlund |
| 5,891,222 A | * | 4/1999 | Hilgendorff et al. ........ 96/11 X |
| 5,904,754 A | * | 5/1999 | Juda et al. ................... 95/56 X |
| 5,938,800 A | | 8/1999 | Verrill et al. |
| 5,997,594 A | | 12/1999 | Edlund et al. |
| 5,998,053 A | | 12/1999 | Diethelm |
| 6,042,956 A | | 3/2000 | Lenel |
| 6,045,772 A | | 4/2000 | Szydlowski et al. |
| 6,077,620 A | | 6/2000 | Pettit |
| 6,083,637 A | | 7/2000 | Walz et al. |
| 6,103,411 A | | 8/2000 | Matsubayashi et al. |
| 6,152,995 A | | 11/2000 | Edlund |
| 6,165,633 A | | 12/2000 | Negishi |
| 6,190,623 B1 | | 2/2001 | Sanger et al. |
| 6,201,029 B1 | | 3/2001 | Waycuilis |
| 6,221,117 B1 | | 4/2001 | Edlund et al. |
| 6,231,831 B1 | * | 5/2001 | Autenrieth et al. ......... 96/11 X |
| 6,319,306 B1 | * | 11/2001 | Edlund et al. .............. 96/11 X |
| 6,332,913 B1 | * | 12/2001 | Breitschwerdt et al. ..... 96/11 X |

* cited by examiner

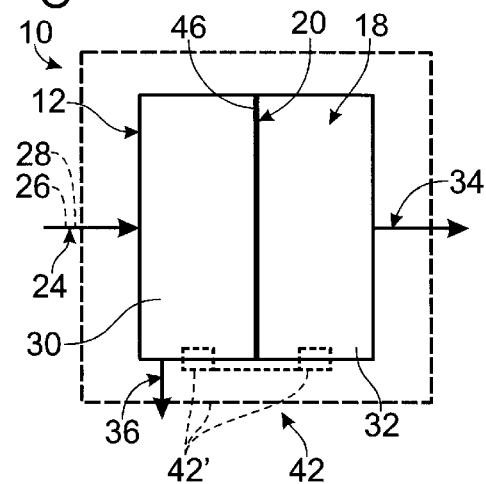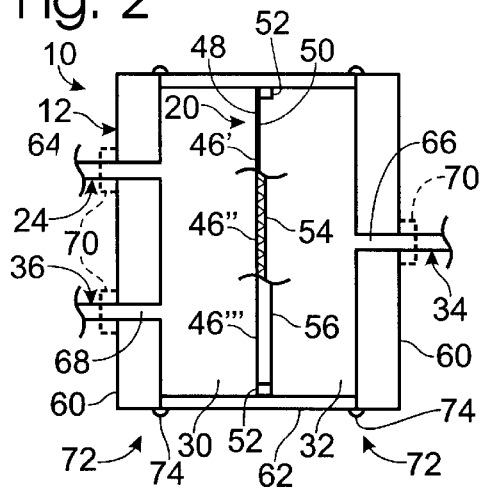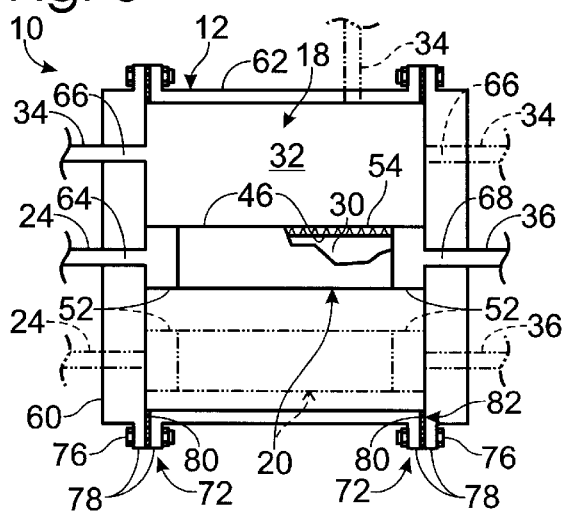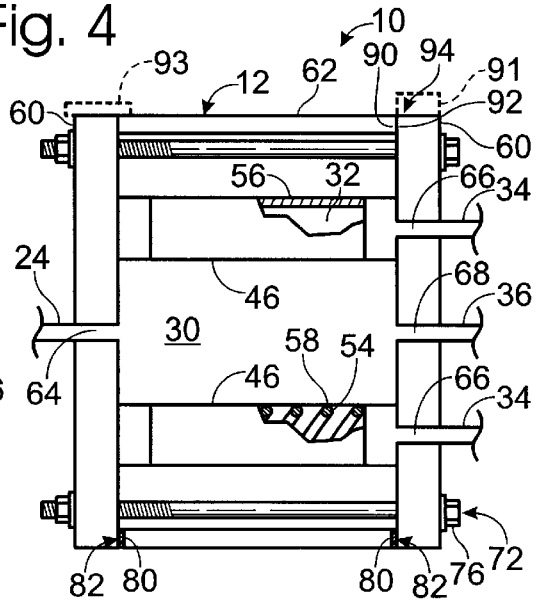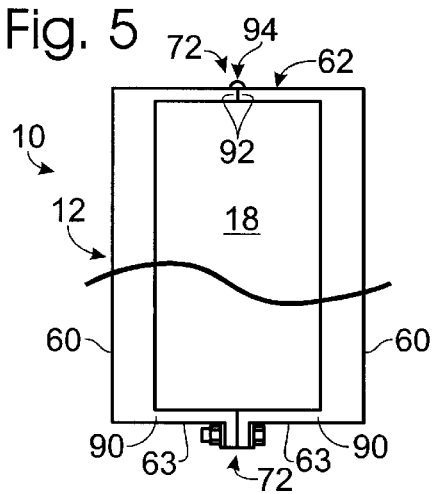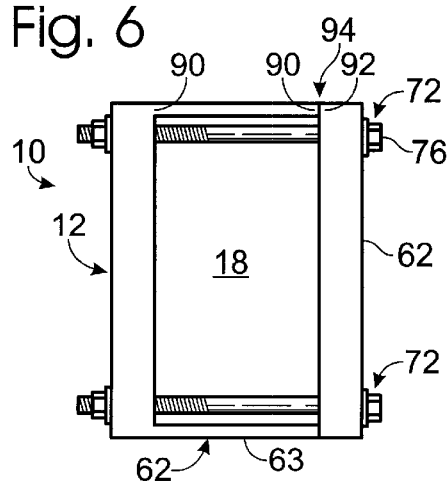

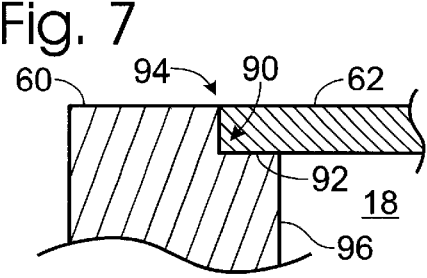
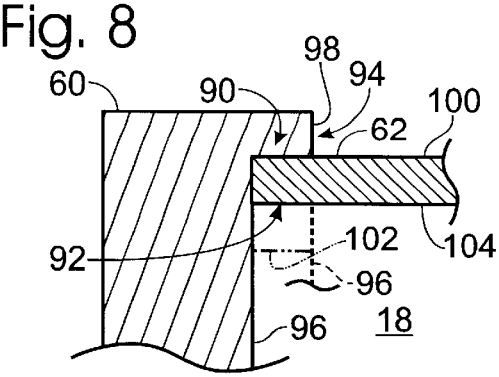
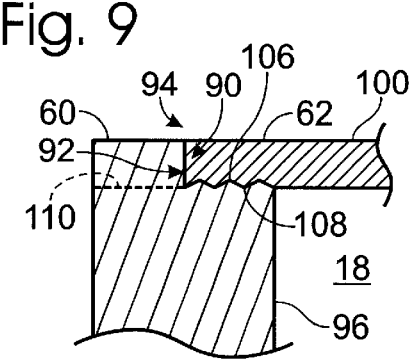
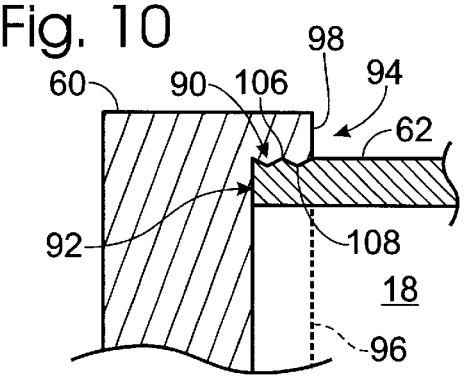
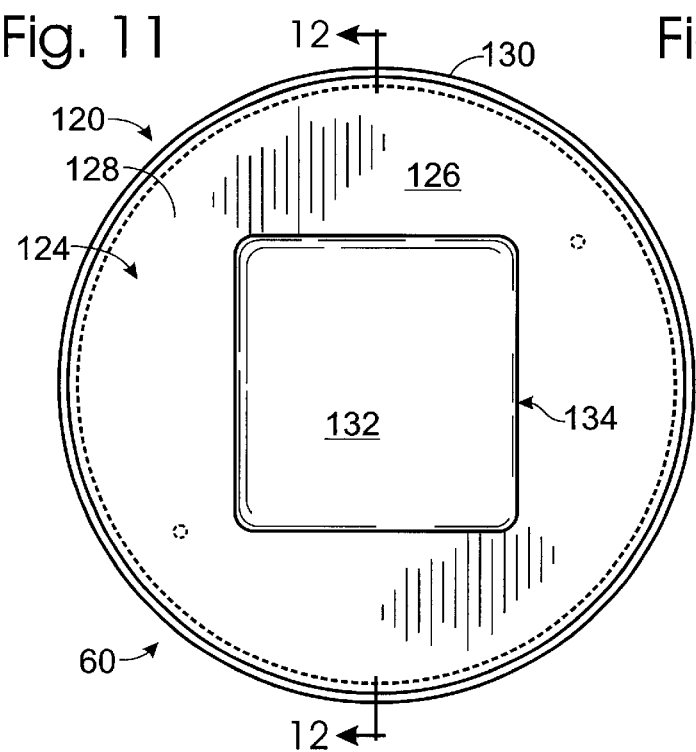
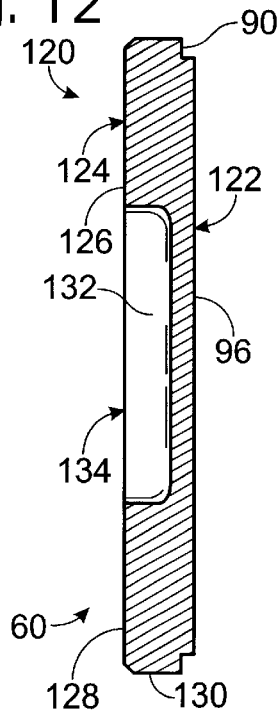

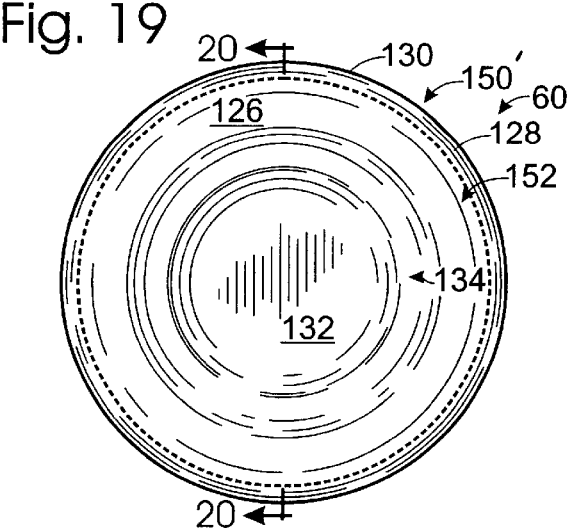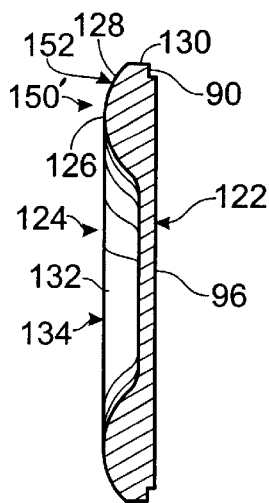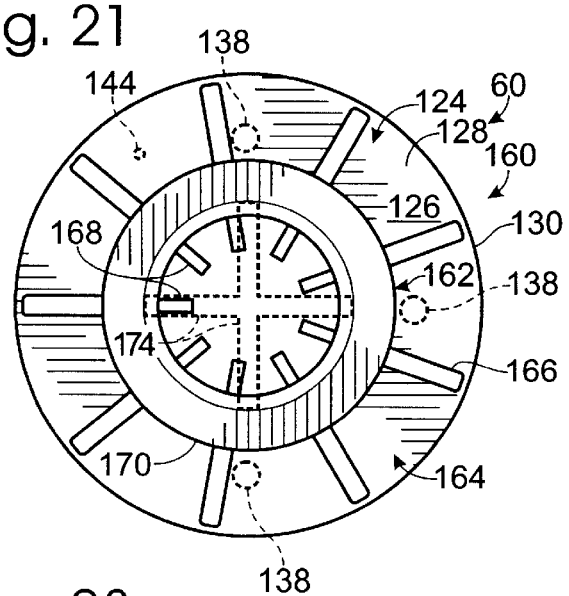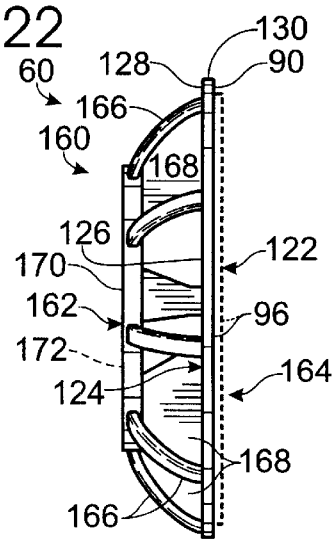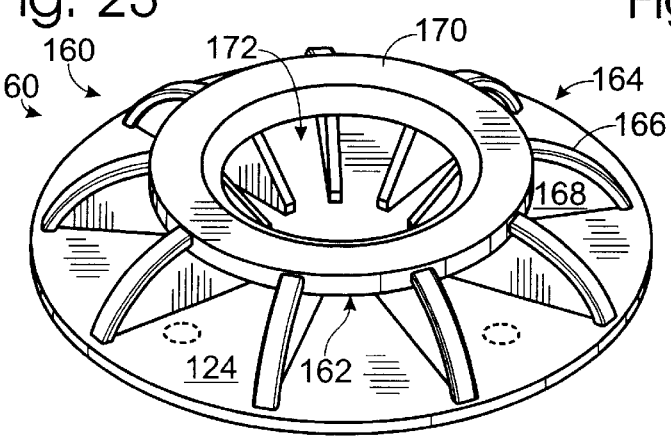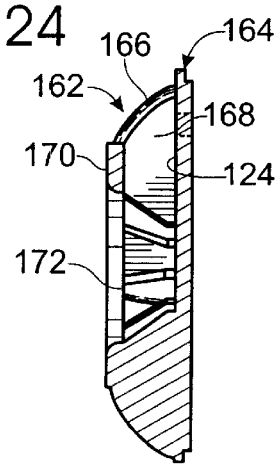

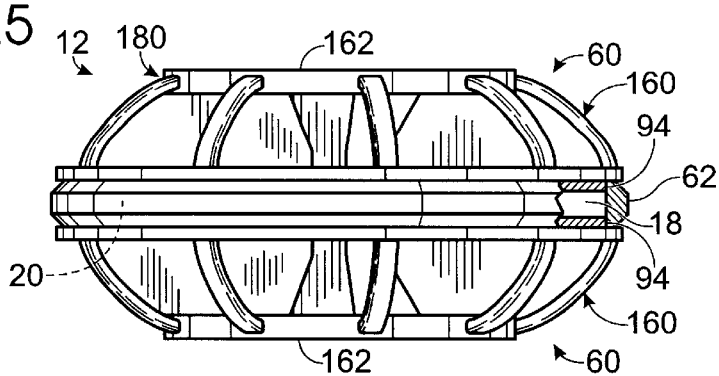
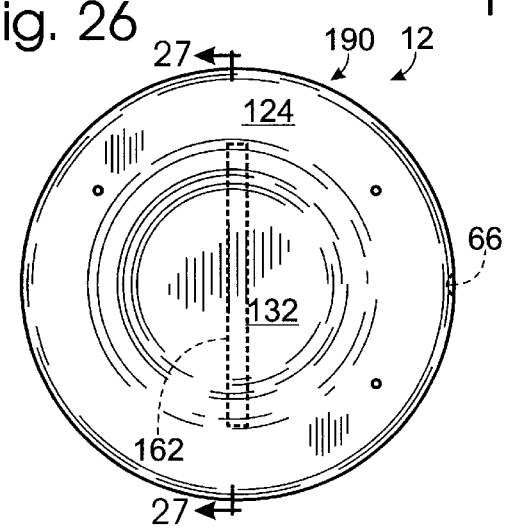
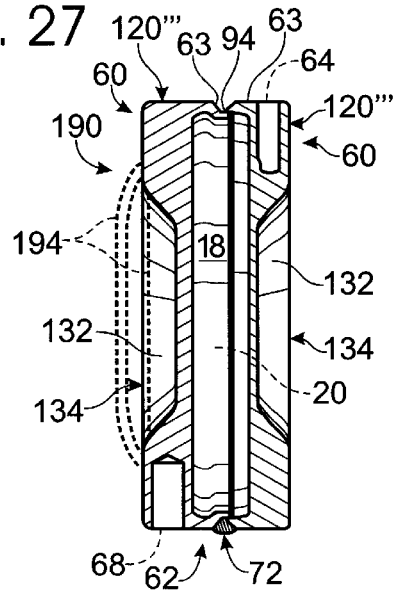
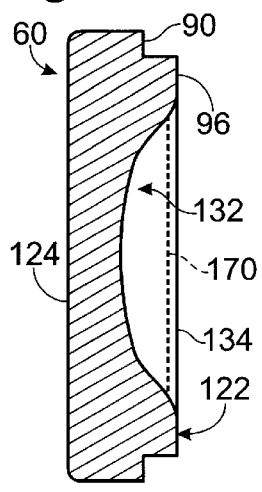
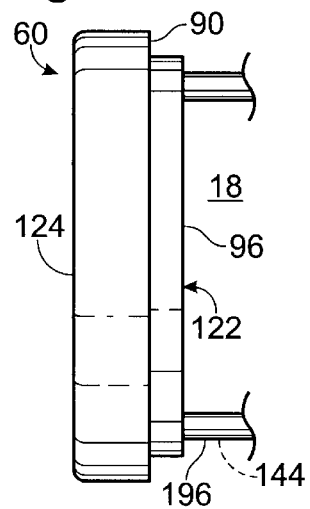
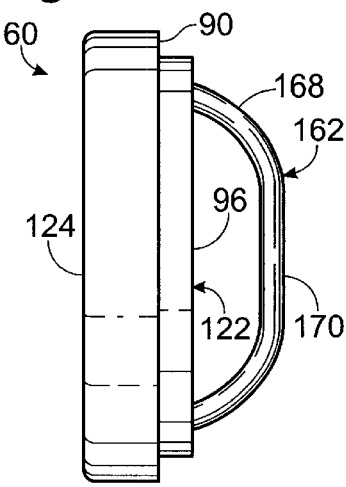

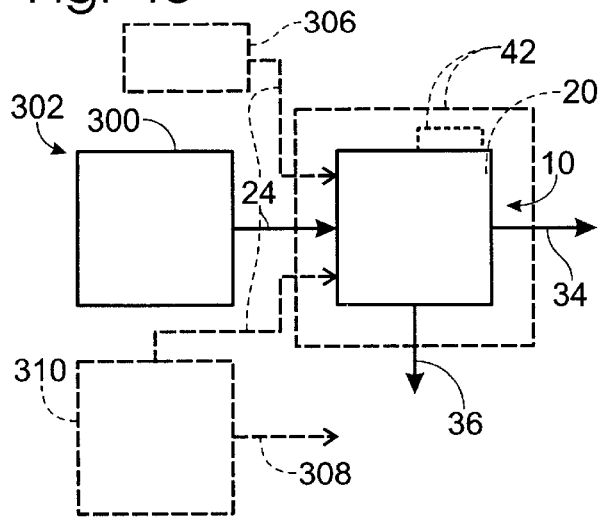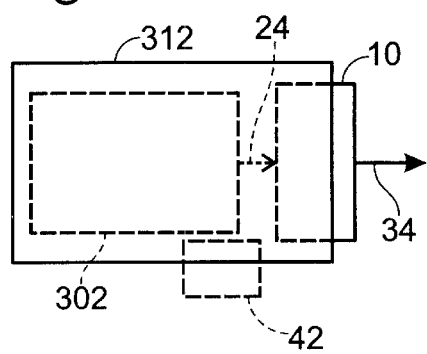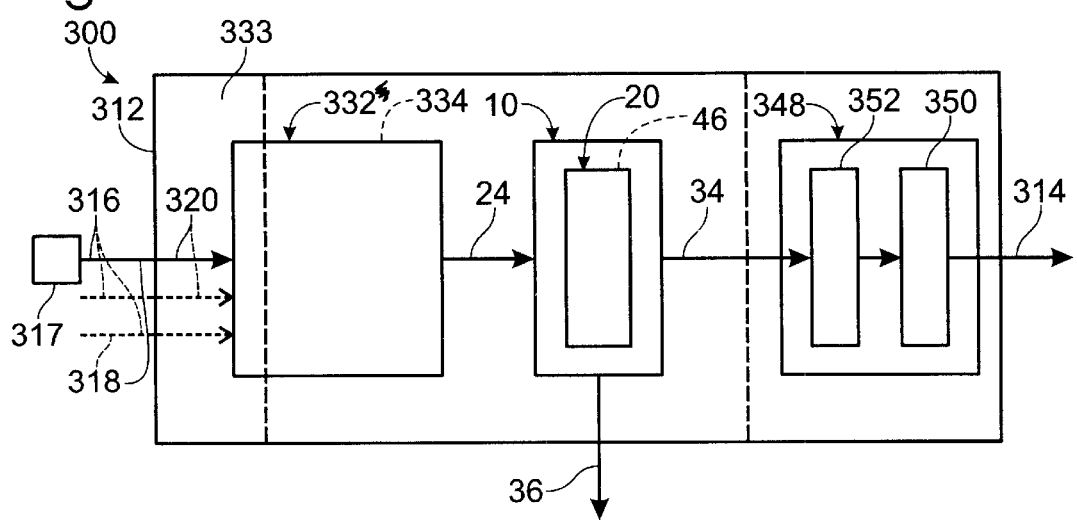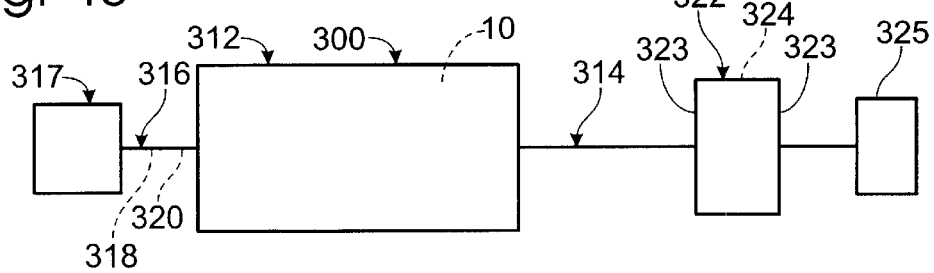

US 6,494,937 B1

HYDROGEN PURIFICATION DEVICES, COMPONENTS AND FUEL PROCESSING SYSTEMS CONTAINING THE SAME

FIELD OF THE INVENTION

The present invention is related generally to the purification of hydrogen gas, and more specifically to hydrogen purification devices, components and fuel processing and fuel cell systems containing the same.

BACKGROUND OF THE INVENTION

Purified hydrogen is used in the manufacture of many products including metals, edible fats and oils, and semi-conductors and microelectronics. Purified hydrogen is also an important fuel source for many energy conversion devices. For example, fuel cells use purified hydrogen and an oxidant to produce an electrical potential. Various processes and devices may be used to produce the hydrogen gas that is consumed by the fuel cells. However, many hydrogen-production processes produce an impure hydrogen stream, which may also be referred to as a mixed gas stream that contains hydrogen gas. Prior to delivering this stream to a fuel cell or stack of fuel cells, the mixed gas stream may be purified, such as to remove undesirable impurities.

SUMMARY OF THE INVENTION

The present invention is directed to hydrogen purification devices, components of hydrogen purification devices, and fuel processing and fuel cell systems that include hydrogen purification devices. The hydrogen purification devices include an enclosure that contains a separation assembly adapted to receive a mixed gas stream containing hydrogen gas and to produce a stream that contains pure or at least substantially pure hydrogen gas therefrom. The separation assembly may include at least one hydrogen-permeable and/or hydrogen-selective membrane. In some embodiments, the enclosure includes a pair of end plates and a shell extending generally between the end plates. In some embodiments, the enclosure includes a shell that is integrated with at least one of the end plates. In some embodiments, at least one of the end plates includes a deflection and/or stress abatement structure. In some embodiments, the device includes components formed from materials having similar or the same coefficients of thermal expansion.

Many other features of the present invention will become manifest to those versed in the art upon making reference to the detailed description which follows and the accompanying sheets of drawings in which preferred embodiments incorporating the principles of this invention are disclosed as illustrative examples only.

BRIEF DESCRIPTION OF THE DRAWINGS

FIG. 1 is a schematic view of a hydrogen purification device.

FIG. 2 is a schematic cross-sectional view of a hydrogen purification device having a planar separation membrane.

FIG. 3 is a schematic cross-sectional view of a hydrogen purification device having a tubular separation membrane.

FIG. 4 is a schematic cross-sectional view of another hydrogen purification device having a tubular separation membrane.

FIG. 5 is a schematic cross-sectional view of another enclosure for a hydrogen purification device constructed according to the present invention.

FIG. 6 is a schematic cross-sectional view of another enclosure for a hydrogen purification device constructed according to the present invention.

FIG. 7 is a fragmentary cross-sectional detail showing another suitable interface between components of an enclosure for a purification device according to the present invention.

FIG. 8 is a fragmentary cross-sectional detail showing another suitable interface between components of an enclosure for a purification device according to the present invention.

FIG. 9 is a fragmentary cross-sectional detail showing another suitable interface between components of an enclosure for a purification device according to the present invention.

FIG. 10 is a fragmentary cross-sectional detail showing another suitable interface between components of an enclosure for a purification device according to the present invention.

FIG. 11 is a top plan view of an end plate for a hydrogen purification device constructed according to the present invention, including those shown in FIGS. 1–6.

FIG. 12 is a cross-sectional view of the end plate of FIG. 11.

FIG. 19 is a top plan view of an end plate for an enclosure for a hydrogen purification device constructed according to the present invention, including those shown in FIGS. 1–6.

FIG. 20 is a cross-sectional view of the end plate of FIG. 19.

FIG. 21 is a top plan view of an end plate for an enclosure for a hydrogen purification device constructed according to the present invention, including those shown in FIGS. 1–6.

FIG. 22 is a side elevation view of the end plate of FIG. 21.

FIG. 23 is an isometric view of the end plate of FIG. 21.

FIG. 24 is a cross-sectional view of the end plate of FIG. 21.

FIG. 25 is a partial cross-sectional side elevation view of an enclosure for a hydrogen purification device constructed with a pair of the end plates shown in FIGS. 21–24.

FIG. 26 is an isometric view of another hydrogen purification device constructed according to the present invention.

FIG. 27 is a cross-sectional view of the device of FIG. 26.

FIG. 28 is a side elevation view of another end plate for a hydrogen purification device constructed according to the present invention, including those shown in FIGS. 1–6.

FIG. 29 is a side elevation view of another end plate for a hydrogen purification device constructed according to the present invention, including those shown in FIGS. 1–6.

FIG. 30 is a side elevation view of another end plate for a hydrogen purification device constructed according to the present invention, including those shown in FIGS. 1–6.

FIG. 40 is a schematic diagram of a fuel processing system that includes a fuel processor and a hydrogen purification device constructed according to the present invention.

FIG. 41 is a schematic diagram of a fuel processing system that includes a fuel processor integrated with a hydrogen purification device according to the present invention.

FIG. 42 is a schematic diagram of another fuel processor that includes an integrated hydrogen purification device constructed according to the present invention.

FIG. 43 is a schematic diagram of a fuel cell system that includes a hydrogen purification device constructed according to the present invention.

DETAILED DESCRIPTION AND BEST MODE OF THE INVENTION

Figure 13:
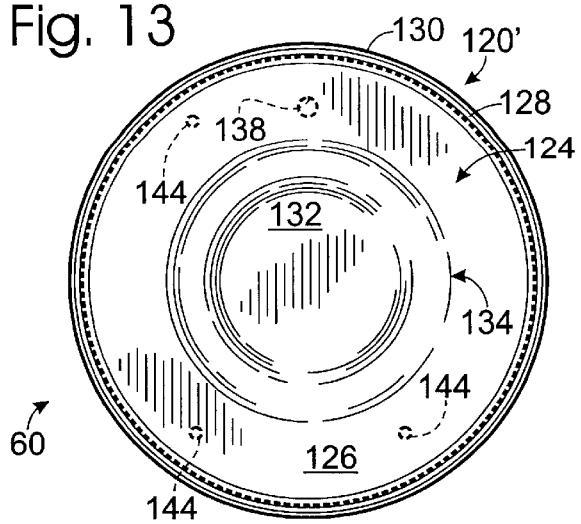
FIG. 13 is a top plan view of an end plate for a hydrogen purification device constructed according to the present invention, including those shown in FIGS. 1–6.

A hydrogen purification device is schematically illustrated in FIG. 1 and generally indicated at 10. Device 10 includes a body, or enclosure, 12 that defines an internal compartment 18 in which a separation assembly 20 is positioned. A mixed gas stream 24 containing hydrogen gas 26 and other gases 28 is delivered to the internal compartment. More specifically, the mixed gas stream is delivered to a mixed gas region 30 of the internal compartment and into contact with separation assembly 20. Separation assembly 20 includes any suitable structure adapted to receive the mixed gas stream and to produce therefrom a permeate, or hydrogen-rich, stream. Stream 34 typically will contain pure or at least substantially pure hydrogen gas. However, it within the scope of the invention that stream 34 may at least initially also include a carrier, or sweep, gas component.

In the illustrated embodiment, the portion of the mixed gas stream that passes through the separation assembly enters a permeate region 32 of the internal compartment. This portion of the mixed gas stream forms hydrogen-rich stream 34, and the portion of the mixed gas stream that does not pass through the separation assembly forms a byproduct stream 36, which contains at least a substantial portion of the other gases. In some embodiments, byproduct stream 36 may contain a portion of the hydrogen gas present in the mixed gas stream. It is also within the scope of the invention that the separation assembly is adapted to trap or otherwise retain at least a substantial portion of the other gases, which will be removed as a byproduct stream as the assembly is replaced, regenerated or otherwise recharged. In FIG. 1, streams 24–28 are meant to schematically represent that each of streams 24–28 may include more that one actual stream flowing into or out of device 10. For example, device 10 may receive plural feed streams 24, a single stream 24 that is divided into plural streams prior to contacting separation assembly 20, or simply a single stream that is delivered into compartment 18.

Device 10 is typically operated at elevated temperatures and/or pressures. For example, device 10 may be operated at (selected) temperatures in the range of ambient temperatures up to 700° C. or more. In many embodiments, the selected temperature will be in the range of 200° C. and 500° C., in other embodiments, the selected temperature will be in the range of 250° C. and 400° C. and in still other embodiments, the selected temperature will be 400° C.± either 25° C., 50° C. or 75° C. Device 10 may be operated at (selected) pressures in the range of approximately 50 psi and 1000 psi or more. In many embodiments, the selected pressure will be in the range of 50 psi and 250 or 500 psi, in other embodiments, the selected pressure will be less than 300 psi or less than 250 psi, and in still other embodiments, the selected pressure will be 175 psi± either 25 psi, 50 psi or 75 psi. As a result, the enclosure must be sufficiently well sealed to achieve and withstand the operating pressure.

It should be understood that as used herein with reference to operating parameters like temperature or pressure, the term "selected" refers to defined or predetermined threshold values or ranges of values, with device 10 and any associated components being configured to operate at or within these selected values. For further illustration, a selected operating temperature may be an operating temperature above or below a specific temperature, within a specific range of temperatures, or within a defined tolerance from a specific temperature, such as within 5%, 10%, etc. of a specific temperature.

In embodiments of the hydrogen purification device in which the device is operated at an elevated operating temperature, heat needs to be applied to the device to raise the temperature of the device to the selected operating temperature. For example, this heat may be provided by any suitable heating assembly 42. Illustrative examples of heating assembly 42 have been schematically illustrated in FIG. 1. It should be understood that assembly 42 may take any suitable form, including mixed gas stream 24 itself. Illustrative examples of other suitable heating assemblies include one or more of a resistance heater, a burner or other combustion region that produces a heated exhaust stream, heat exchange with a heated fluid stream other than mixed gas stream 24, etc. When a burner or other combustion chamber is used, a fuel stream is consumed and byproduct stream 36 may form all or a portion of this fuel stream. At 42' in FIG. 1, schematic representations have been made to illustrate that the heating assembly may deliver the heated fluid stream external device 10, such as within a jacket that surrounds or at least partially surrounds the enclosure, by a stream that extends into the enclosure or through passages in the enclosure, or by conduction, such as with an electric resistance heater or other device that radiates or conducts electrically generated heat.

A suitable structure for separation assembly 20 is one or more hydrogen-permeable and/or hydrogen-selective membranes 46. The membranes may be formed of any hydrogen-permeable material suitable for use in the operating environment and parameters in which purification device 10 is operated. Examples of suitable materials for membranes 46 include palladium and palladium alloys, and especially thin films of such metals and metal alloys. Palladium alloys have proven particularly effective, especially palladium with 35 wt % to 45 wt % copper. These membranes are typically formed from a thin foil that is approximately 0.001 inches thick. It is within the scope of the present invention, however, that the membranes may be formed from hydrogen-permeable and/or hydrogen-selective materials, including metals and metal alloys other than those discussed above as well as non-metallic materials and compositions, and that the membranes may have thicknesses that are greater or less than discussed above. For example, the membrane may be made thinner, with commensurate increase in hydrogen flux. Examples of suitable mechanisms for reducing the thickness of the membranes include rolling, sputtering and etching. A suitable etching process is disclosed in U.S. Pat. No. 6,152,995, the complete disclosure of which is hereby incorporated by reference for all purposes. Examples of various membranes, membrane configurations, and methods for preparing the same are disclosed in U.S. Pat. No. 6,221,117 and U.S. patent application Ser. No. 09/812,499, the complete disclosures of which are hereby incorporated by reference for all purposes.

In FIG. 2, illustrative examples of suitable configurations for membranes 46 are shown. As shown, membrane 46 includes a mixed-gas surface 48 which is oriented for contact by mixed gas stream 24, and a permeate surface 50, which is generally opposed to surface 48. Also shown at 52 are schematic representations of mounts, which may be any suitable structure for supporting and/or positioning the membranes or other separation assemblies within compartment 18. The patent and patent applications incorporated immediately above also disclose illustrative examples of suitable mounts 52. At 46', membrane 46 is illustrated as a foil or film. At 46", the membrane is supported by an underlying support 54, such as a mesh or expanded metal screen or a ceramic or other porous material. At 46''', the membrane is coated or formed onto or otherwise bonded to a porous member 56. It should be understood that the membrane configurations discussed above have been illustrated schematically in FIG. 2 and are not intended to represent every possible configuration within the scope of the invention.

For example, although membrane 46 is illustrated in FIG. 2 as having a planar configuration, it is within the scope of the invention that membrane 46 may have non-planar configurations as well. For example, the shape of the membrane may be defined at least in part by the shape of a support 54 or member 56 upon which the membrane is supported and/or formed. As such, membranes 46 may have concave, convex or other non-planar configurations, especially when device 10 is operating at an elevated pressure. As another example, membrane 46 may have a tubular configuration, such as shown in FIGS. 3 and 4.

In FIG. 3, an example of a tubular membrane is shown in which the mixed gas stream is delivered to the interior of the membrane tube. In this configuration, the interior of the membrane tube defines region 30 of the internal compartment, and the permeate region 32 of the compartment lies external the tube. An additional membrane tube is shown in dashed lines in FIG. 3 to represent graphically that it is within the scope of the present invention that device 10 may include more than one membrane and/or more than one mixed-gas surface 48. It is within the scope of the invention that device 10 may also include more than two membranes, and that the relative spacing and/or configuration of the membranes may vary.

In FIG. 4, another example of a hydrogen purification device 10 that includes tubular membranes is shown. In this illustrated configuration, device 10 is configured so that the mixed gas stream is delivered into compartment 18 external to the membrane tube or tubes. In such a configuration, the mixed-gas surface of a membrane tube is exterior to the corresponding permeate surface, and the permeate region is located internal the membrane tube or tubes.

The tubular membranes may have a variety of configurations and constructions, such as those discussed above with respect to the planar membranes shown in FIG. 2. For example, illustrative examples of various mounts 52, supports 54 and porous members 56 are shown in FIGS. 3 and 4, including a spring 58, which has been schematically illustrated. It is further within the scope of the invention that tubular membranes may have a configuration other than the straight cylindrical tube shown in FIG. 3. Examples of other configurations include U-shaped tubes and spiral or helical tubes.

As discussed, enclosure 12 defines a pressurized compartment 18 in which separation assembly 20 is positioned. In the embodiments shown in FIGS. 2–4, enclosure 12 includes a pair of end plates 60 that are joined by a perimeter shell 62. It should be understood that device 10 has been schematically illustrated in FIGS. 2–4 to show representative examples of the general components of the device without intending to be limited to geometry, shape and size. For example, end plates 60 typically are thicker than the walls of perimeter shell 62, but this is not required. Similarly, the thickness of the end plates may be greater than, less than or the same as the distance between the end plates. As a further example, the thickness of membrane 46 has been exaggerated for purposes of illustration.

In FIGS. 2–4, it can be seen that mixed gas stream 24 is delivered to compartment 18 through an input port 64, hydrogen-rich (or permeate) stream 34 is removed from device 10 through one or more product ports 66, and the byproduct stream is removed from device 10 through one or more byproduct ports 68. In FIG. 2, the ports are shown extending through various ones of the end plates to illustrate that the particular location on enclosure 12 from which the gas streams are delivered to and removed from device 10 may vary. It is also within the scope of the invention that one or more of the streams may be delivered or withdrawn through shell 62, such as illustrated in dashed lines in FIG. 3. It is further within the scope of the invention that ports 64–68 may include or be associated with flow-regulating and/or coupling structures. Examples of these structures include one or more of valves, flow and pressure regulators, connectors or other fittings and/or manifold assemblies that are configured to permanently or selectively fluidly interconnect device 10 with upstream and downstream components. For purposes of illustration, these flow-regulating and/or coupling structures are generally indicated at 70 in FIG. 2. For purposes of brevity, structures 70 have not been illustrated in every embodiment. Instead, it should be understood that some or all of the ports for a particular embodiment of device 10 may include any or all of these structures, that each port does not need to have the same, if any, structure 70, and that two or more ports may in some embodiments share or collectively utilize structure 70, such as a common collection or delivery manifold, pressure relief valve, fluid-flow valve, etc.

End plates 60 and perimeter shell 62 are secured together by a retention structure 72. Structure 72 may take any suitable form capable of maintaining the components of enclosure 12 together in a fluid-tight or substantially fluid-tight configuration in the operating parameters and conditions in which device 10 is used. Examples of suitable structures 72 include welds 74 and bolts 76, such as shown in FIGS. 2 and 3. In FIG. 3, bolts 76 are shown extending through flanges 78 that extend from the components of enclosure 12 to be joined. In FIG. 4, bolts 76 are shown extending through compartment 18. It should be understood that the number of bolts may vary, and typically will include a plurality of bolts or similar fastening mechanisms extending around the perimeter of enclosure 18. Bolts 76 should be selected to be able to withstand the operating parameters and conditions of device 10, including the tension imparted to the bolts when device 10 is pressurized.

In the lower halves of FIGS. 3 and 4, gaskets 80 are shown to illustrate that enclosure 12 may, but does not necessarily, include a seal member 82 interconnecting or spanning the surfaces to be joined to enhance the leak-resistance of the enclosure. The seal member should be selected to reduce or eliminate leaks when used at the operating parameters and under the operating conditions of the device. Therefore, in many embodiments, high-pressure and/or high-temperature seals should be selected. An illustrative, non-exclusive example of such a seal structure is a graphite gasket, such as sold by Union Carbide under the trade name GRAFOIL™. As used herein, "seal member" and "sealing member" are meant to refer to structures or materials applied to, placed between, or placed in contact with the metallic end plates and shell (or shell portions) to enhance the seal established therebetween. Gaskets or other sealing members may also be used internal compartment 18, such as to provide seals between adjacent membranes, fluid conduits, mounts or supports, and/or any of the above with the internal surface of enclosure 12.

In FIGS. 2–4, the illustrated enclosures include a pair of end plates 60 and a shell 62. With reference to FIG. 4, it can be seen that the end plates include sealing regions 90, which form an interface 94 with a corresponding sealing region 92 of shell 62. In many embodiments, the sealing region of end plate 60 will be perimeter region, and as such, sealing region 90 will often be referred to herein as a perimeter region 90 of the end plate. However, as used herein, the perimeter region is meant to refer to the region of the end plate that extends generally around the central region and which forms an interface with a portion of the shell, even if there are additional portions or edges of the end plate that project beyond this perimeter portion. Similarly, sealing region 92 of shell 62 will typically be an end region of the shell. Accordingly, the sealing region of the shell will often be referred to herein as end region 92 of the shell. It is within the scope of the invention, however, that end plates 60 may have portions that project outwardly beyond the sealing region 90 and interface 94 formed with shell 62, and that shell 62 may have regions that project beyond end plate 60 and the interface formed therewith. These portions are illustrated in dashed lines in FIG. 4 at 91 and 93 for purposes of graphical illustration.

As an alternative to a pair of end plates 60 joined by a separate perimeter shell 62, enclosure 12 may include a shell that is at least partially integrated with either or both of the end plates. For example, in FIG. 5, a portion 63 of shell 62 is integrally formed with each end plate 60. Described another way, each end plate 60 includes shell portions, or collars, 63 that extend from the perimeter region 90 of the end plate. As shown, the shell portions include end regions 92 which intersect at an interface 94. In the illustrated embodiment, the end regions abut each other without a region of overlap; however, it is within the scope of the invention that interface 94 may have other configurations, such as those illustrated and/or described subsequently. End regions 92 are secured together via any suitable mechanism, such as by any of the previously discussed retention structures 72, and may (but do not necessarily) include a seal member 82 in addition to the mating surfaces of end regions 92.

A benefit of shell 62 being integrally formed with at least one of the end plates is that the enclosure has one less interface that must be sealed. This benefit may be realized by reduced leaks due to the reduced number of seals that could fail, fewer components, and/or a reduced assembly time for device 10. Another example of such a construction for enclosure 12 is shown in FIG. 6, in which the shell 62 is integrally formed with one of the end plates, with a shell portion 63 that extends integrally from the perimeter region 90 of one of the end plates. Shell portion 63 includes an end region 92 that forms an interface 94 with the perimeter region 90 of the other end plate via any suitable retention structure 72, such as those described above. The combined end plate and shell components shown in FIGS. 5 and 6 may be formed via any suitable mechanism, including machining them from a solid bar or block of material. For purposes of simplicity, separation assembly 20 and the input and output ports have not been illustrated in FIGS. 5 and 6 and only illustrative, non-exclusive examples of suitable retention structure 72 are shown. Similar to the other enclosures illustrated and described herein, it should be understood that the relative dimensions of the enclosure may vary and still be within the scope of the invention. For example, shell portions 63 may have lengths that are longer or shorter than those illustrated in FIGS. 5 and 6.

Before proceeding to additional illustrative configurations for end plates 60, it should be clarified that as used herein in connection with the enclosures of devices 10, the term "interface" is meant to refer to the interconnection and sealing region that extends between the portions of enclosure 12 that are separately formed and thereafter secured together, such as (but not necessarily) by one of the previously discussed retention structures 72. The specific geometry and size of interface 94 will tend to vary, such as depending upon size, configuration and nature of the components being joined together. Therefore, interface 94 may include a metal-on-metal seal formed between corresponding end regions and perimeter regions, a metal-on-metal seal formed between corresponding pairs of end regions, a metal-gasket (or other seal member 82 )-metal seal, etc. Similarly, the interface may have a variety of shapes, including linear, arcuate and rectilinear configurations that are largely defined by the shape and relative position of the components being joined together.

For example, in FIG. 6, an interface 94 extends between end region 92 of shell portion 63 and perimeter region 90 of end plate 60. As shown, regions 90 and 92 intersect with parallel edges. As discussed, a gasket or other seal member may extend between these edges. In FIGS. 7–10, nonexclusive examples of additional interfaces 94 that are within the scope of the invention are shown. Embodiments of enclosure 12 that include an interface 94 formed between adjacent shell regions may also have any of these configurations. In FIG. 7, perimeter region 90 defines a recess or corner into which end region 92 of shell 62 extends to form an interface 94 that extends around this corner. Also shown in FIG. 7 is central region 96 of end plate 60, which as illustrated extends within shell 62 and defines a region of overlap therewith.

In FIG. 8, perimeter region 90 defines a corner that opens generally toward compartment 18, as opposed to the corner of FIG. 7, which opens generally away from compartment 18. In the configuration shown in FIG. 8, perimeter region 90 includes a collar portion 98 that extends at least partially along the outer surface 100 of shell 62 to define a region of overlap therewith. Central region 96 of plate 60 is shown in solid lines extending along end region 92 without extending into shell 62, in dashed lines extending into shell 62, and in dash-dot lines including an internal support 102 that extends at least partially along the inner surface 104 of shell 60. FIGS. 9 and 10 are similar to FIGS. 7 and 8 except that perimeter region 90 and end region 92 are adapted to threadingly engage each other, and accordingly include corresponding threads 106 and 108. In dashed lines in FIG. 9, an additional example of a suitable configuration for perimeter region 90 of end plate 60 is shown. As shown, the outer edge 110 of the end plate does not extend radially (or outwardly) to or beyond the exterior surface of shell 62.

It should be understood that any of these interfaces may be used with an enclosure constructed according to the present invention. However, for purposes of brevity, every embodiment of enclosure 12 will not be shown with each of these interfaces. Therefore, although the subsequently described end plates shown in FIGS. 11–31 are shown with the interface configuration of FIG. 7, it is within the scope of the invention that the end plates and corresponding shells may be configured to have any of the interfaces described and/or illustrated herein, as well as the integrated shell configuration described and illustrated with respect to FIGS. 5 and 6. Similarly, it should be understood that the devices constructed according to the present invention may have any of the enclosure configurations, interface configurations, retention structure configurations, separation assembly configurations, flow-regulating and/or coupling structures, seal member configurations, and port configurations discussed, described and/or incorporated herein. Similarly, although the following end plate configurations are illustrated with circular perimeters, it is within the scope of the invention that the end plates may be configured to have perimeters with any other geometric configuration, including arcuate, rectilinear, and angular configurations, as well as combinations thereof.

As discussed, the dimensions of device 10 and enclosure 12 may also vary. For example, an enclosure designed to house tubular separation membranes may need to be longer (i.e. have a greater distance between end plates) than an enclosure designed to house planar separation membranes to provide a comparable amount of membrane surface area exposed to the mixed gas stream (i.e., the same amount of effective membrane surface area). Similarly, an enclosure configured to house planar separation membranes may tend to be wider (i.e., have a greater cross-sectional area measured generally parallel to the end plates) than an enclosure designed to house tubular separation membranes. However, it should be understood that neither of these relationships are required, and that the specific size of the device and/or enclosure may vary. Factors that may affect the specific size of the enclosure include the type and size of separation assembly to be housed, the operating parameters in which the device will be used, the flow rate of mixed gas stream 24, the shape and configuration of devices such as heating assemblies, fuel processors and the like with which or within which the device will be used, and to some degree, user preferences.

As discussed previously, hydrogen purification devices may be operated at elevated temperatures and/or pressures. Both of these operating parameters may impact the design of enclosures 12 and other components of the devices. For example, consider a hydrogen purification device 10 operated at a selected operating temperature above an ambient temperature, such as a device operating at 400° C. As an initial matter, the device, including enclosure 12 and separation assembly 20, must be constructed from a material that can withstand the selected operating temperature, and especially over prolonged periods of time and/or with repeated heating and cooling off cycles. Similarly, the materials that are exposed to the gas streams preferably are not reactive or at least not detrimentally reactive with the gases. An example of a suitable material is stainless steel, such as Type 304 stainless steel, although others may be used.

Besides the thermal and reactive stability described above, operating device 10 at a selected elevated temperature requires one or more heating assemblies 42 to heat the device to the selected operating temperature. When the device is initially operated from a shutdown, or unheated, state, there will be an initial startup or preheating period in which the device is heated to the selected operating temperature. During this period, the device may not produce a hydrogen-rich stream at all, a hydrogen-rich stream that contains more than an acceptable level of the other gases, and/or a reduced flow rate of the hydrogen-rich stream compared to the byproduct stream or streams (meaning that a greater percentage of the hydrogen gas is being exhausted as byproduct instead of product). In addition to the time to heat the device, one must also consider the heat or thermal energy required to heat the device to the selected temperature. The heating assembly or assemblies may add to the operating cost, materials cost, and/or equipment cost of the device. For example, a simplified end plate 60 is a relatively thick slab having a uniform thickness. In fact, stainless steel plates having a uniform thickness of 0.5" or 0.75 inches have proven effective to support and withstand the operating parameters and conditions of device 10. However, the dimensions of these plates add considerable weight to device 10, and in many embodiments require considerable thermal energy to be heated to the selected operating temperature. As used herein, the term "uniform thickness" is meant to refer to devices that have a constant or at least substantially constant thickness, including those that deviate in thickness by a few (less than 5%) along their lengths. In contrast, and as used herein, a "variable thickness" will refer to a thickness that varies by at least 10%, and in some embodiments at least 25%, 40% or 50%.

The pressure at which device 10 is operated may also affect the design of device 10, including enclosure 12 and separation assembly 20. Consider for example a device operating at a selected pressure of 175 psi. Device 10 must be constructed to be able to withstand the stresses encountered when operating at the selected pressure. This strength requirement affects not only the seals formed between the components of enclosure 12, but also the stresses imparted to the components themselves. For example, deflection or other deformation of the end plates and/or shell may cause gases within compartment 18 to leak from the enclosure. Similarly, deflection and/or deformation of the components of the device may also cause unintentional mixing of two or more of gas streams 24, 34 and 36. For example, an end plate may deform plastically or elastically when subjected to the operating parameters under which device 10 is used. Plastic deformation results in a permanent deformation of the end plate, the disadvantage of which appears fairly evident. Elastic deformation, however, also may impair the operation of the device because the deformation may result in internal and/or external leaks. More specifically, the deformation of the end plates or other components of enclosure 12 may enable gases to pass through regions where fluid-tight seals previously existed. As discussed, device 10 may include gaskets or other seal members to reduce the tendency of these seals to leak, however, the gaskets have a finite size within which they can effectively prevent or limit leaks between opposing surfaces. For example, internal leaks may occur in embodiments that include one or more membrane envelopes or membrane plates compressed (with or without gaskets) between the end plates. As the end plates deform and deflect away from each other, the plates and/or gaskets may in those regions not be under the same tension or compression as existed prior to the deformation. Gaskets, or gasket plates, may be located between a membrane envelope and adjacent feed plates, end plates, and/or other adjacent membrane envelopes. Similarly, gaskets or gasket plates may also be positioned within a membrane envelope to provide additional leak prevention within the envelope.

In view of the above, it can be seen that there are two or three competing factors to be weighed with respect to device 10. In the context of enclosure 12, the heating requirements of the enclosure will tend to increase as the materials used to form the enclosure are thickened. To some degree using thicker materials may increase the strength of the enclosure, however, it may also increase the heating and material requirements, and in some embodiments actually produce regions to which greater stresses are imparted compared to a thinner enclosure. Areas to monitor on an end plate include the deflection of the end plate, especially at the perimeter regions that form interface(s) 94, and the stresses imparted to the end plate.

Consider for example a circular end plate formed from Type 304 stainless steel and having a uniform thickness of 0.75 inches. Such an end plate weights 7.5 pounds. A hydrogen purification device containing this end plate was exposed to operating parameters of 400° C. and 175 psi. Maximum stresses of 25,900 psi were imparted to the end plate, with a maximum deflection of 0.0042 inches and a deflection at perimeter region 90 of 0.0025 inches.

Another end plate 60 constructed according to the present invention is shown in FIGS. 11 and 12 and generally indicated at 120. As shown, end plate 120 has interior and exterior surfaces 122 and 124. Interior surface 122 includes central region 96 and perimeter region 90. Exterior surface 124 has a central region 126 and a perimeter region 128, and in the illustrated embodiment, plate 120 has a perimeter 130 extending between the perimeter regions 90 and 128 of the interior and exterior surfaces. As discussed above, perimeter region 90 may have any of the configurations illustrated or described above, including a configuration in which the sealing region is at least partially or completely located along perimeter 130. In the illustrated embodiment, perimeter 130 has a circular configuration. However, it is within the scope of the invention that the shape may vary, such as to include rectilinear and other arcuate, geometric, linear, and/or cornered configurations.

Unlike the previously illustrated end plates, however, the central region of the end plate has a variable thickness between its interior and exterior surfaces, which is perhaps best seen in FIG. 12. Unlike a uniform slab of material, the exterior surface of plate 120 has a central region 126 that includes an exterior cavity, or removed region, 132 that extends into the plate and generally toward central region 96 on interior surface 122. Described another way, the end plate has a nonplanar exterior surface, and more specifically, an exterior surface in which at least a portion of the central region extends toward the corresponding central region of the end plate's interior surface. Region 132 reduces the overall weight of the end plate compared to a similarly constructed end plate that does not include region 132. As used herein, removed region 132 is meant to exclude ports or other bores that extend completely through the end plates. Instead, region 132 extends into, but not through, the end plate.

A reduction in weight means that a purification device 10 that includes the end plate will be lighter than a corresponding purification device that includes a similarly constructed end plate formed without region 132. With the reduction in weight also comes a corresponding reduction in the amount of heat (thermal energy) that must be applied to the end plate to heat the end plate to a selected operating temperature. In the illustrated embodiment, region 132 also increases the surface area of exterior surface 124. Increasing the surface area of the end plate compared to a corresponding end plate may, but does not necessarily in all embodiments, increase the heat transfer surface of the end plate, which in turn, can reduce the heating requirements and/or time of a device containing end plate 120.

In some embodiments, plate 120 may also be described as having a cavity that corresponds to, or includes, the region of maximum stress on a similarly constructed end plate in which the cavity was not present. Accordingly, when exposed to the same operating parameters and conditions, lower stresses will be imparted to end plate 120 than to a solid end plate formed without region 132. For example, in the solid end plate with a uniform thickness, the region of maximum stress occurs within the portion of the end plate occupied by removed region 132 in end plate 120. Accordingly, an end plate with region 132 may additionally or alternatively be described as having a stress abatement structure 134 in that an area of maximum stress that would otherwise be imparted to the end plate has been removed.

For purposes of comparison, consider an end plate 120 having the configuration shown in FIGS. 11 and 12, formed from Type 304 stainless steel, and having a diameter of 6.5 inches. This configuration corresponds to maximum plate thickness of 0.75 inches and a removed region 132 having a length and width of 3 inches. When utilized in a device 10 operating at 400° C. and 175 psi, plate 120 has a maximum stress imparted to it of 36,000 psi, a maximum deflection of 0.0078 inches, a displacement of 0.0055 inches at perimeter region 90, and a weight of 5.7 pounds. It should be understood that the dimensions and properties described above are meant to provide an illustrative example of the combinations of weight, stress and displacement experienced by end plates according to the present invention, and that the specific perimeter shape, materials of construction, perimeter size, thickness, removed region shape, removed region depth and removed region perimeter all may vary within the scope of the invention.

In FIG. 11, it can be seen that region 132 (and/or stress abatement structure 134) has a generally square or rectilinear configuration measured transverse to surfaces 122 and 124. As discussed, other geometries and dimensions may be used and are within the scope of the invention. To illustrate this point, variations of end plate 120 are shown in FIGS. 13–16 and generally indicated at 120' and 120". In these figures, region 132 is shown having a circular perimeter, with the dimensions of the region being smaller in FIGS. 13 and 14 than in FIGS. 15 and 16.

Figure 14:
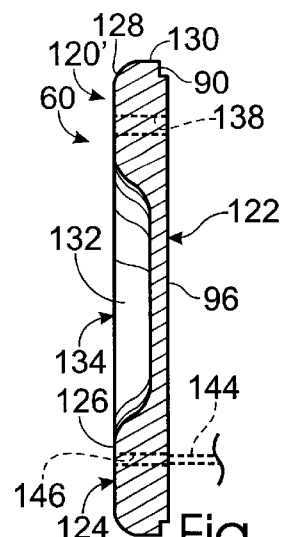
FIG. 14 is a cross-sectional view of the end plate of FIG. 13.

For purposes of comparison, consider an end plate 120 having the configuration shown in FIGS. 13 and 14 and having the same materials of construction, perimeter and thickness as the end plate shown in FIGS. 11 and 12. Instead of the generally square removed region of FIGS. 11 and 12, however, end plate 120' has a removed region with a generally circular perimeter and a diameter of 3.25 inches. End plate 120' weighs the same as end plate 120, but has reduced maximum stress and deflections. More specifically, while end plate 120 had a maximum stress greater than 35,000 psi, end plate 120' had a maximum stress that is less than 30,000 psi, and in the illustrated configuration less than 25,000 psi, when subjected to the operating parameters discussed above with respect to plate 120. In fact, plate 120' demonstrated approximately a 35% reduction in maximum stress compared to plate 120. The maximum and perimeter region deflections of plate 120' were also less than plate 120, with a measured maximum deflection of 0.007 inches and a measured deflection at perimeter region 90 of 0.0050 inches.

Figure 15:
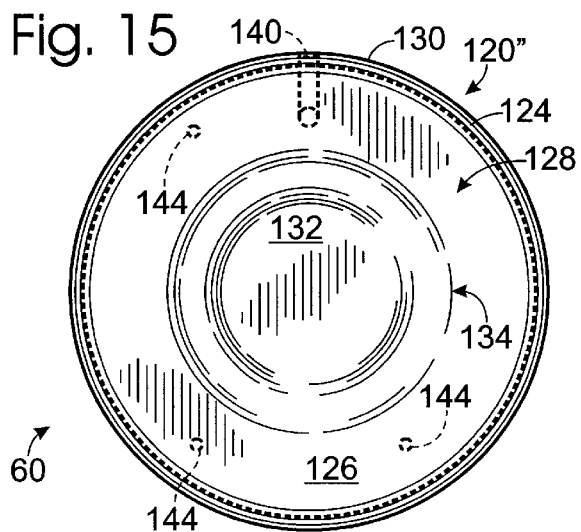
FIG. 15 is a top plan view of an end plate for a hydrogen purification device constructed according to the present invention, including those shown in FIGS. 1–6.
Figure 16:
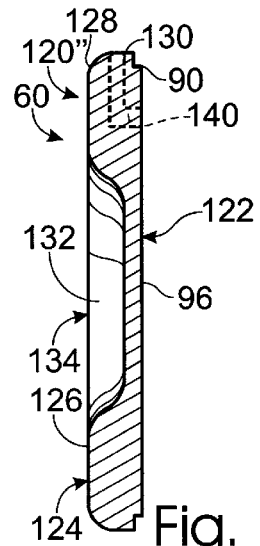
FIG. 16 is a cross-sectional view of the end plate of FIG. 15.

End plate 120", which is shown in FIGS. 15 and 16 is similar to end plate 120', except region 132 (and/or structure 134) has a diameter of 3.75 inches instead of 3.25 inches. This change in the size of the removed region decreases the weight of the end plate to 5.3 pounds and produced the same maximum deflection. End plate 120" also demonstrated a maximum stress that is less than 25,000 psi, although approximately 5% greater than that of end plate 120' (24,700 psi, compared to 23,500 psi). At perimeter region 90, end plate 120" exhibited a maximum deflection of 0.0068 inches.

In FIGS. 13–16, illustrative port configurations have been shown. In FIGS. 13 and 14, a port 138 is shown in dashed lines extending from interior surface 122 through the end plate to exterior surface 124. Accordingly, with such a configuration a gas stream is delivered or removed via the exterior surface of the end plate of device 10. In such a configuration, fluid conduits and/or flow-regulating and/or coupling structure 70 typically will project from the exterior surface 124 of the end plate. Another suitable configuration is indicated at 140 in dashed lines in FIGS. 15 and 16. As shown, port 140 extends from the interior surface of the end plate then through perimeter 130 instead of exterior surface 124. Accordingly, port 140 enables gas to be delivered or removed from the perimeter of the end plate instead of the exterior surface of the end plate. It should be understood that ports 64–68 may have these configurations illustrated by ports 138 and 140. Of course, ports 64–68 may have any other suitable port configuration as well, including a port that extends through shell 62 or a shell portion. For purposes of simplicity, ports will not be illustrated in many of the subsequently described end plates, just as they were not illustrated in FIGS. 5 and 6.

Also shown in dashed lines in FIGS. 13–15 are guide structures 144. Guide structures 144 extend into compartment 18 and provide supports that may be used to position and/or align separation assembly 20, such as membranes 46. In some embodiments, guide structures 144 may themselves form mounts 52 for the separation assembly. In other embodiments, the device includes mounts other than guide structures 144. Guide structures may be used with any of the end plates illustrated, incorporated and/or described herein, regardless of whether any such guide structures are shown in a particular drawing figure. However, it should also be understood that hydrogen purification devices according to the present invention may be formed without guide structures 144. In embodiments of device 10 that include guide structures 144 that extend into or through compartment 18, the number of such structures may vary from a single support to two or more supports. Similarly, while guide structures 144 have been illustrated as cylindrical ribs or projections, other shapes and configurations may be used within the scope of the invention.

Guide structures 144 may be formed from the same materials as the corresponding end plates. Additionally or alternatively, the guide structures may include a coating or layer of a different material. Guide structures 144 may be either separately formed from the end plates and subsequently attached thereto, or integrally formed therewith. Guide structures 144 may be coupled to the end plates by any suitable mechanism, including attaching the guide structures to the interior surfaces of the end plates, inserting the guide structures into bores extending partially through the end plates from the interior surfaces thereof, or inserting the guide structures through bores that extend completely through the end plates. In embodiments where the end plates include bores that extend completely through the end plates (which are graphically illustrated for purposes of illustration at 146 in FIG. 14), the guide structures may be subsequently affixed to the end plates. Alternatively, the guide structures may be inserted through compartment 18 until the separation assembly is properly assigned and secured therein, and then the guide structures may be removed and the bores sealed (such as by welding) to prevent leaks.

Figure 17:
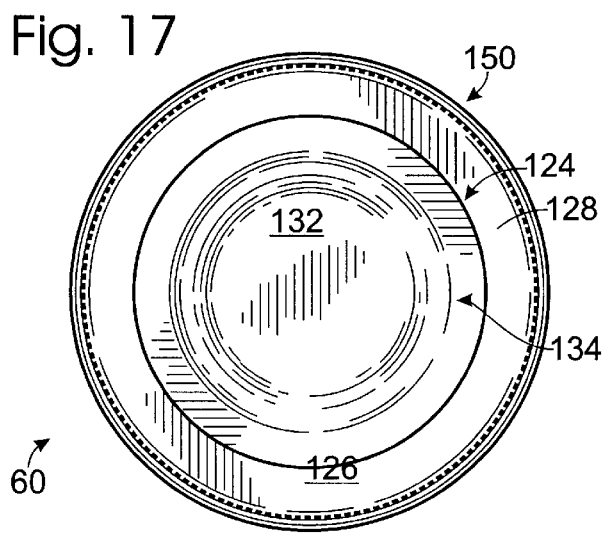
FIG. 17 is a top plan view of an end plate for a hydrogen purification device constructed according to the present invention, including those shown in FIGS. 1–6.
Figure 18:
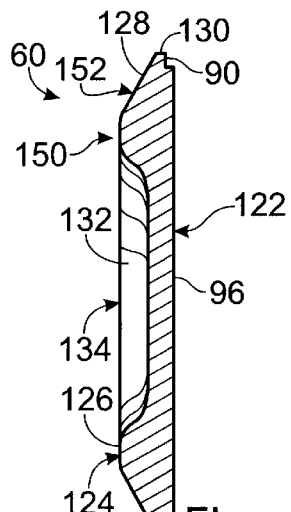
FIG. 18 is a cross-sectional view of the end plate of FIG. 17.

In FIGS. 17 and 18, another end plate 60 constructed according to the present invention is shown and generally indicated at 150. Unless otherwise specified, it should be understood that end plates 150 may have any of the elements, subelements and variations as any of the other end plates shown, described and/or incorporated herein. Similar to end plate 120', plate 150 includes an exterior surface 124 with a removed region 132 (and/or stress abatement structure 134) having a circular perimeter with a diameter of 3.25 inches. Exterior surface 124 further includes an outer removed region 152 that extends from central region 126 to perimeter portion 128. Outer removed region 152 decreases in thickness as it approaches perimeter 130. In the illustrated embodiment, region 152 has a generally linear reduction in thickness, although other linear and arcuate transitions may be used. For example, a variation of end plate 150 is shown in FIGS. 19 and 20 and generally indicated at 150'. End plate 150' also includes central and exterior removed regions 132 and 152, with exterior surface 124 having a generally semitoroidal configuration as it extends from central region 126 to perimeter region 128. To demonstrate that the size of region 132 (which will also be referred to as a central removed region, such as when embodied on an end plate that also includes an outer removed region), may vary, end plate 150' includes a central removed region having a diameter of 3 inches.

For purposes of comparison, both end plates 150 and 150' have reduced weights compared to end plates 120, 120' and 120". Plate 150 weighed 4.7 pounds, and plate 150' weighed 5.1 pounds. Both end plates 150 and 150' experienced maximum stresses of 25,000 psi or less when subjected to the operating parameters discussed above (400° C. and 175 psi), with plate 150' having a 5% lower stress than plate 150 (23,750 psi compared to 25,000 psi). The maximum deflections of the plates were 0.0098 inches and 0.008 inches, respectively, and the displacements at perimeter regions 90 were 0.0061 inches and 0.0059 inches, respectively.

Another end plate 60 constructed according to the present invention is shown in FIGS. 21–24 and generally indicated at 160. Unless otherwise specified, end plate 160 may have the same elements, subelements and variations as the other end plates illustrated, described and/or incorporated herein. End plate 160 may be referred to as a truss-stiffened end plate because it includes a truss assembly 162 that extends from the end plate's exterior surface 124. As shown, end plate 160 has a base plate 164 with a generally planar configuration, similar to the end plates shown in FIGS. 2–5. However, truss assembly 162 enables, but does not require, that the base plate may have a thinner construction while still providing comparable if not reduced maximum stresses and deflections. It is within the scope of the invention that any of the other end plates illustrated, described and/or incorporated herein also may include a truss assembly 162.

Truss assembly 162 extends from exterior surface 124 of base plate 164 and includes a plurality of projecting ribs 166 that extend from exterior surface 124. In FIGS. 21–24, it can be seen that ribs 166 are radially spaced around surface 124. Nine ribs 166 are shown in FIGS. 21 and 23, but it is within the scope of the invention that truss assembly 162 may be formed with more or fewer ribs. Similarly, in the illustrated embodiment, ribs 166 have arcuate configurations, and include flanges 168 extending between the ribs and surface 124. Flanges 168 may also be described as heat transfer fins because they add considerable heat transfer area to the end plate. Truss assembly 162 further includes a tension collar 170 that interconnects the ribs. As shown, collar 170 extends generally parallel to surface base plate 164 and has an open central region 172. Collar 170 may be formed with a closed or internally or externally projecting central portion without departing from the invention. To illustrate this point, members 174 are shown in dashed lines extending across collar 170 in FIG. 21. Similarly, collar 170 may have configurations other than the circular configuration shown in FIGS. 21–24. As a further alternative, base plate 164 has been indicated in partial dashed lines in FIG. 22 to graphically illustrate that the base plate may have a variety of configurations, such as those described, illustrated and incorporated herein, including the configuration shown if the dashed region is removed.

End plate 160 may additionally, or alternatively, be described as having a support 170 that extends in a spaced-apart relationship beyond exterior surface 124 of base plate 164 and which is adapted to provide additional stiffness and/or strength to the base plate. Still another additional or alternative description of end plate 160 is that the end plate includes heat transfer structure 162 extending away from the exterior surface of the base plate, and that the heat transfer structure includes a surface 170 that is spaced-away from surface 124 such that a heated fluid stream may pass between the surfaces.

Truss assembly 162 may also be referred to as an example of a deflection abatement structure because it reduces the deflection that would otherwise occur if base plate 164 were formed without the truss assembly. Similarly, truss assembly 162 may also provide another example of a stress abatement restructure because it reduces the maximum stresses that would otherwise be imparted to the base plate. Furthermore, the open design of the truss assembly increases the heat transfer area of the base plate without adding significant weight to the base plate.

Continuing the preceding comparisons between end plates, plate 160 was subjected to the same operating parameters as the previously described end plates. The maximum stresses imparted to base plate 164 were 10,000 psi or less. Similarly, the maximum deflection of the base plate was only 0.0061 inches, with a deflection of 0.0056 inches at perimeter region 90. It should be noted, that base plate 160 achieved this significant reduction in maximum stress while weighing only 3.3 pounds. Similarly, base plate 164 experienced a smaller maximum displacement and comparable or reduced perimeter displacement yet had a base plate that was only 0.25 inches thick. Of course, plate 160 may be constructed with thicker base plates, but the tested plate proved to be sufficiently strong and rigid under the operating parameters with which it was used.

As discussed, enclosure 12 may include a pair of end plates 60 and a perimeter shell. In FIG. 25, an example of an enclosure 12 formed with a pair of end plates 160 is shown for purposes of illustration and indicated generally at 180. Although enclosure 180 has a pair of truss-stiffened end plates 160, it is within the scope of the invention that an enclosure may have end plates having different constructions and/or configurations. In fact, in some operating environments it may be beneficial to form enclosure 12 with two different types of end plates. In others, it may be beneficial for the end plates to have the same construction.

In FIGS. 26 and 27 another example of an enclosure 12 is shown and generally indicated at 190 and includes end plates 120'''. End plates 120''' have a configuration similar to FIGS. 13–16, except removed region 132 is shown having a diameter of 4 inches to further illustrate that the shape and size of the removed region may vary within the scope of the invention. Both end plates include shell portions 63 extending integrally therefrom to illustrate that any of the end plates illustrated, described, and/or incorporated herein may include a shell portion 63 extending integrally therefrom. To illustrate that any of the end plates described, illustrated and/or incorporated herein may also include truss assemblies (or heat transfer structure) 162 and/or projecting supports 170 or deflection abatement structure, members 194 are shown projecting across removed region 132 in a spaced-apart configuration from the exterior surface 124 of the end plate.

It is also within the scope of the invention that enclosure 12 may include stress and/or deflection abatement structures that extend into compartment 18 as opposed to, or in addition to, corresponding structures that extend from the exterior surface of the end plates. In FIGS. 28–30, end plates 60 are shown illustrating examples of these structures. For example, in FIG. 28, end plate 60 includes a removed region 132 that extends into the end plate from the interior surface 122 of the end plate. It should be understood that region 132 may have any of the configurations described, illustrated and/or incorporated herein with respect to removed regions that extend from the exterior surface of a base plate. Similarly, in dashed lines at 170 in FIG. 28, supports are shown extending across region 132 to provide additional support and/or rigidity to the end plate. In FIG. 29, end plate 60 includes internal supports 196 that are adapted to extend into compartment 18 to interconnect the end plate with the corresponding end plate at the other end of the compartment. As discussed, guide structures 144 may form such a support. In FIG. 30, an internally projecting truss assembly 162 is shown.

Although not required or essential to the invention, in some embodiments, device 10 includes end plates 60 that exhibit at least one of the following properties or combinations of properties compared to an end plate formed from a solid slab of uniform thickness of same material as end plate 60 and exposed to the same operating parameters:

- a projecting truss assembly;
- an internally projecting support;
- an externally projecting support;
- an external removed region;
- an internal removed region;
- an integral shell portion;
- an integral shell;
- a reduced mass and reduced maximum stress;
- a reduced mass and reduced maximum displacement;
- a reduced mass and reduced perimeter displacement;
- a reduced mass and increased heat transfer area;
- a reduced mass and internally projecting supports;
- a reduced mass and externally projecting supports;
- a reduced maximum stress and reduced maximum displacement;
- a reduced maximum stress and reduced perimeter displacement;
- a reduced maximum stress and increased heat transfer area;
- a reduced maximum stress and a projecting truss assembly;
- a reduced maximum stress and a removed region;
- a reduced maximum displacement and reduced perimeter displacement;
- a reduced maximum displacement and increased heat transfer area;
- a reduced perimeter displacement and increased heat transfer area;
- a reduced perimeter displacement and a projecting truss assembly;
- a reduced perimeter displacement and a removed region;
- a mass/maximum displacement ratio that is less than 1500 lb/psi;
- a mass/maximum displacement ratio that is less than 1000 lb/psi;
- a mass/maximum displacement ratio that is less than 750 lb/psi;
- a mass/maximum displacement ratio that is less than 500 lb/psi;
- a mass/perimeter displacement ratio that is less than 2000 lb/psi;
- a mass/perimeter displacement ratio that is less than 1500 lb/psi;
- a mass/perimeter displacement ratio that is less than 1000 lb/psi;
- a mass/perimeter displacement ratio that is less than 800 lb/psi;
- a mass/perimeter displacement ratio that is less than 600 lb/psi;
- a cross-sectional area/mass ratio that is at least 6 in$^2$/pound;
- a cross-sectional area/mass ratio that is at least 7 in$^2$/pound; and/or
- a cross-sectional area/mass ratio that is at least 10 in$^2$/pound.

As discussed, enclosure 12 contains an internal compartment 18 that houses separation assembly 20, such as one or more separation membranes 46, which are supported within the enclosure by a suitable mount 52. In the illustrative examples shown in FIGS. 2 and 4, the separation membranes 46 were depicted as independent planar or tubular membranes. It is also within the scope of the invention that the membranes may be arranged in pairs that define permeate region 32 therebetween. In such a configuration, the membrane pairs may be referred to as a membrane envelope, in that they define a common permeate region 32 in the form of a harvesting conduit, or flow path, extending therebetween and from which hydrogen-rich stream 34 may be collected.

Figure 31:
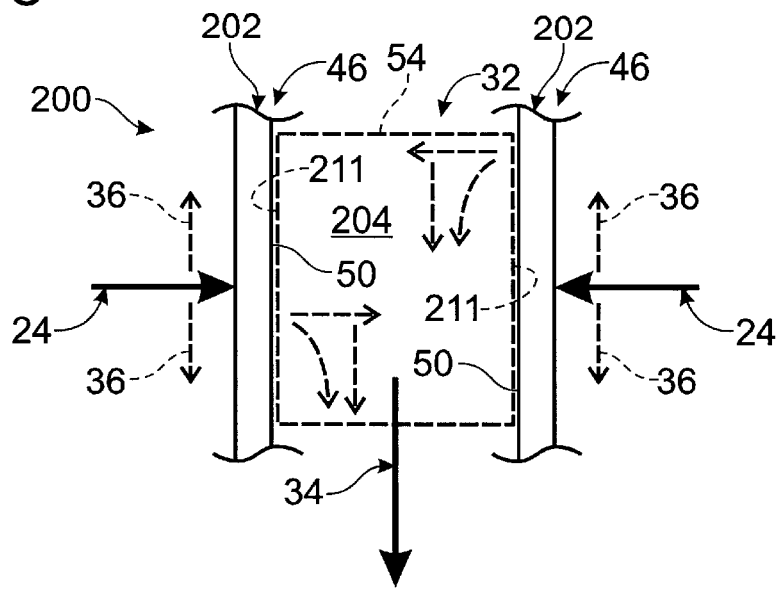
FIG. 31 is a fragmentary side elevation view of a pair of separation membranes separated by a support.

An example of a membrane envelope is shown in FIG. 31 and generally indicated at 200. It should be understood that the membrane pairs may take a variety of suitable shapes, such as planar envelopes and tubular envelopes. Similarly, the membranes may be independently supported, such as with respect to an end plate or around a central passage. For purposes of illustration, the following description and associated illustrations will describe the separation assembly as including one or more membrane envelopes 200. It should be understood that the membranes forming the envelope may be two separate membranes, or may be a single membrane folded, rolled or otherwise configured to define two membrane regions, or surfaces, 202 with permeate surfaces 50 that are oriented toward each other to define a conduit 204 therebetween from which the hydrogen-rich permeate gas may be collected and withdrawn. Conduit 204 may itself form permeate region 32, or a device 10 according to the present invention may include a plurality of membrane envelopes 200 and corresponding conduits 204 that collectively define permeate region 32.

To support the membranes against high feed pressures, a support 54 is used. Support 54 should enable gas that permeates through membranes 46 to flow therethough. Support 54 includes surfaces 211 against which the permeate surfaces 50 of the membranes are supported. In the context of a pair of membranes forming a membrane envelope, support 54 may also be described as defining harvesting conduit 204. In conduit 204, permeated gas preferably may flow both transverse and parallel to the surface of the membrane through which the gas passes, such as schematically illustrated in FIG. 31. The permeate gas, which is at least substantially pure hydrogen gas, may then be harvested or otherwise withdrawn from the envelope to form hydrogen-rich stream 34. Because the membranes lie against the support, it is preferable that the support does not obstruct the flow of gas through the hydrogen-selective membranes. The gas that does not pass through the membranes forms one or more byproduct streams 36, as schematically illustrated in FIG. 31.

Figure 32:
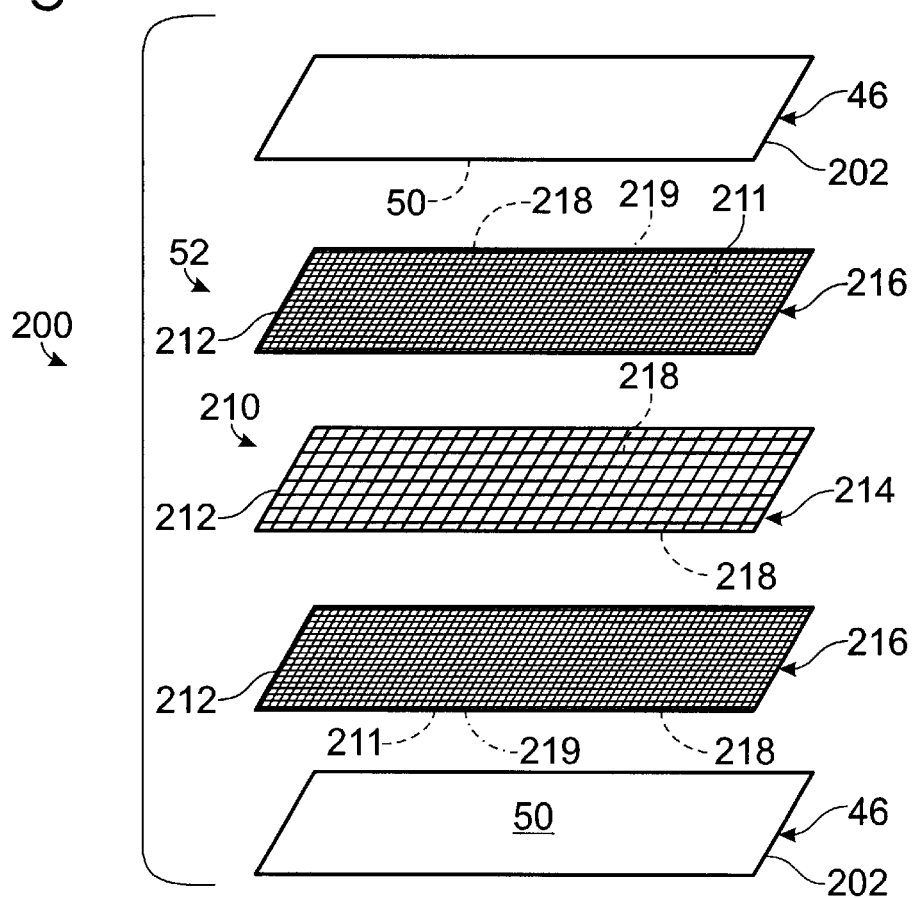
FIG. 32 is an exploded isometric view of a membrane envelope constructed according to the present invention and including a support in the form of a screen structure having several layers.

An example of a suitable support 54 for membrane envelopes 200 is shown in FIG. 32 in the form of a screen structure 210. Screen structure 210 includes plural screen members 212. In the illustrated embodiment, the screen members include a coarse mesh screen 214 sandwiched between fine mesh screens 216. It should be understood that the terms "fine" and "coarse" are relative terms. Preferably, the outer screen members are selected to support membranes 46 without piercing the membranes and without having sufficient apertures, edges or other projections that may pierce, weaken or otherwise damage the membrane under the operating conditions with which device 10 is operated. Because the screen structure needs to provide for flow of the permeated gas generally parallel to the membranes, it is preferable to use a relatively coarser inner screen member to provide for enhanced, or larger, parallel flow conduits. In other words, the finer mesh screens provide better protection for the membranes, while the coarser mesh screen provides better flow generally parallel to the membranes.

The screen members may be of similar or the same construction, and more or less screen members may be used than shown in FIG. 32. Preferably, support 54 is formed from a corrosion-resistant material that will not impair the operation of the hydrogen purification device and other devices with which device 10 is used. Examples of suitable materials for metallic screen members include stainless steels, titanium and alloys thereof, zirconium and alloys thereof, corrosion-resistant alloys, including Inconel™ alloys, such as 800H™, and Hastelloy™ alloys, and alloys of copper and nickel, such as Monel™. Additional examples of structure for supports 54 include porous ceramics, porous carbon, porous metal, ceramic foam, carbon foam, and metal foam, either alone, or in combination with one or more screen members 212. As another example, some or all of the screen members may be formed from expanded metal instead of a woven mesh material.

During fabrication of the membrane envelopes, adhesive may be used to secure membranes 46 to the screen structure and/or to secure the components of screen structure 210 together, as discussed in more detail in the above-incorporated U.S. patent application Ser. No. 09/812,499. For purposes of illustration, adhesive is generally indicated in dashed lines at 218 in FIG. 32. An example of a suitable adhesive is sold by 3M under the trade name SUPER 77. Typically, the adhesive is at least substantially, if not completely, removed after fabrication of the membrane envelope so as not to interfere with the permeability, selectivity and flow paths of the membrane envelopes. An example of a suitable method for removing adhesive from the membranes and/or screen structures or other supports is by exposure to oxidizing conditions prior to initial operation of device 10. The objective of the oxidative conditioning is to burn out the adhesive without excessively oxidizing the palladium-alloy membrane. A suitable procedure for such oxidizing is disclosed in the above-incorporated patent application.

Supports 54, including screen structure 210, may include a coating 219 on the surfaces 71 that engage membranes 46, such as indicated in dash-dot lines in FIG. 32. Examples of suitable coatings include aluminum oxide, tungsten carbide, tungsten nitride, titanium carbide, titanium nitride, and mixtures thereof. These coatings are generally characterized as being thermodynamically stable with respect to decomposition in the presence of hydrogen. Suitable coatings are formed from materials, such as oxides, nitrides, carbides, or intermetallic compounds, that can be applied as a coating and which are thermodynamically stable with respect to decomposition in the presence of hydrogen under the operating parameters (temperature, pressure, etc.) under which the hydrogen purification device will be operated. Suitable methods for applying such coatings to the screen or expanded metal screen member include chemical vapor deposition, sputtering, thermal evaporation, thermal spraying, and, in the case of at least aluminum oxide, deposition of the metal (e.g., aluminum) followed by oxidation of the metal to give aluminum oxide. In at least some embodiments, the coatings may be described as preventing intermetallic diffusion between the hydrogen-selective membranes and the screen structure.

The hydrogen purification devices 10 described, illustrated and/or incorporated herein may include one or more membrane envelopes 200, typically along with suitable input and output ports through which the mixed gas stream is delivered and from which the hydrogen-rich and byproduct streams are removed. In some embodiments, the device may include a plurality of membrane envelopes. When the separation assembly includes a plurality of membrane envelopes, it may include fluid conduits interconnecting the envelopes, such as to deliver a mixed gas stream thereto, to withdraw the hydrogen-rich stream therefrom, and/or to withdraw the gas that does not pass through the membranes from mixed gas region 30. When the device includes a plurality of membrane envelopes, the permeate stream, byproduct stream, or both, from a first membrane envelope may be sent to another membrane envelope for further purification. The envelope or plurality of envelopes and associated ports, supports, conduits and the like may be referred to as a membrane module 220.

The number of membrane envelopes 200 used in a particular device 10 depends to a degree upon the feed rate of mixed gas stream 24. For example, a membrane module 220 containing four envelopes 200 has proven effective for a mixed gas stream delivered to device 10 at a flow rate of 20 liters/minute. As the flow rate is increased, the number of membrane envelopes may be increased, such as in a generally linear relationship. For example, a device 10 adapted to receive mixed gas stream 24 at a flow rate of 30 liters/minute may preferably include six membrane envelopes. However, these exemplary numbers of envelopes are provided for purposes of illustration, and greater or fewer numbers of envelopes may be used. For example, factors that may affect the number of envelopes to be used include the hydrogen flux through the membranes, the effective surface area of the membranes, the flow rate of mixed gas stream 24, the desired purity of hydrogen-rich stream 34, the desired efficiency at which hydrogen gas is removed from mixed gas stream 24, user preferences, the available dimensions of device 10 and compartment 18, etc.

Figure 33:
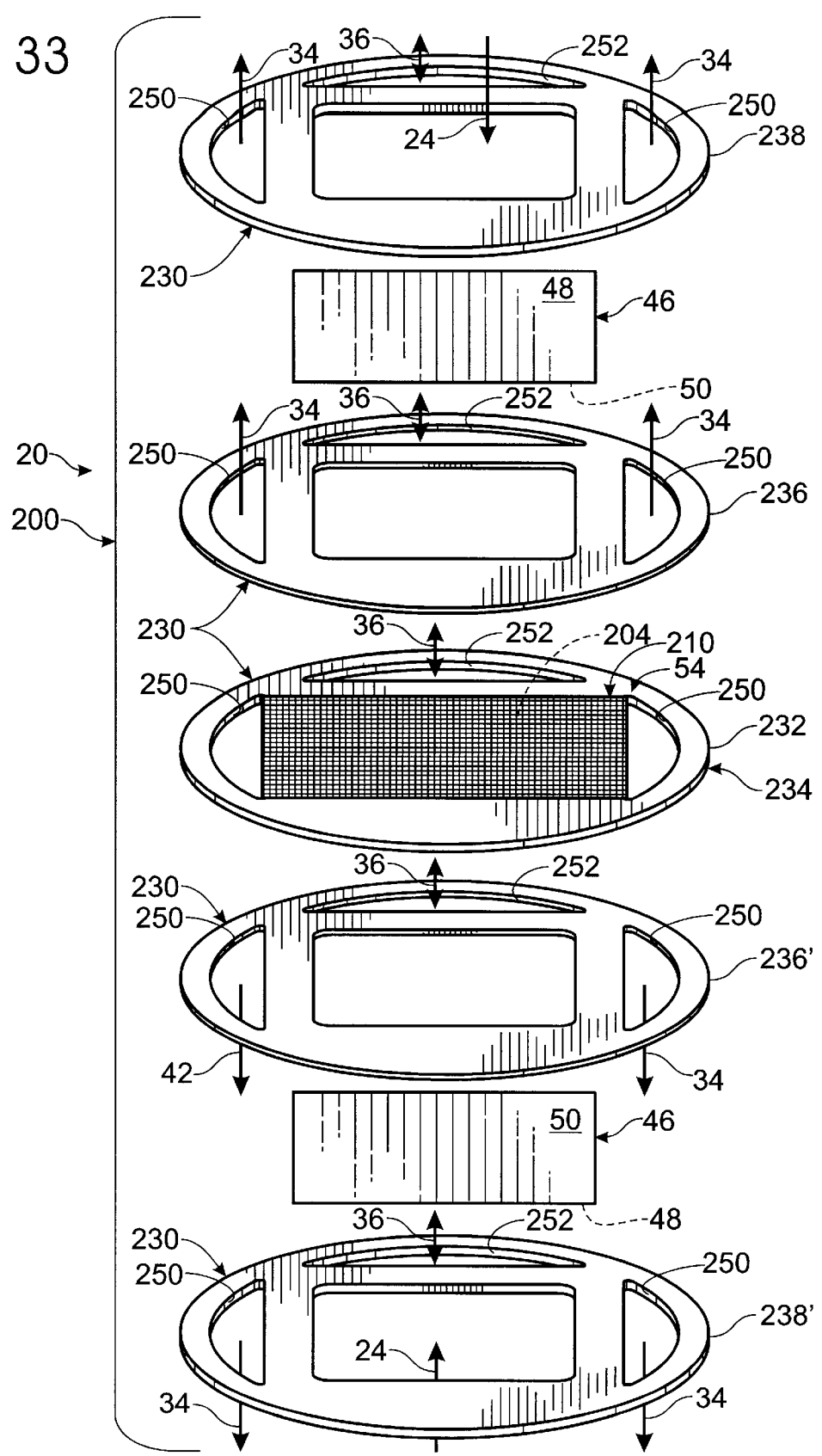
FIG. 33 is an exploded isometric view of another membrane envelope according to the present invention.

Preferably, but not necessarily, the screen structure and membranes that are incorporated into a membrane envelope 200 include frame members 230, or plates, that are adapted to seal, support and/or interconnect the membrane envelopes. An illustrative example of suitable frame members 230 is shown in FIG. 33. As shown, screen structure 210 fits within a frame member 230 in the form of a permeate frame 232. The screen structure and frame 232 may collectively be referred to as a screen plate or permeate plate 234. When screen structure 210 includes expanded metal members, the expanded metal screen members may either fit within permeate frame 232 or extend at least partially over the surface of the frame. Additional examples of frame members 230 include supporting frames, feed plates and/or gaskets. These frames, gaskets or other support structures may also define, at least in part, the fluid conduits that interconnect the membrane envelopes in an embodiment of separation assembly 20 that contains two or more membrane envelopes. Examples of suitable gaskets are flexible graphite gaskets, including those sold under the trade name GRAFOIL™ by Union Carbide, although other materials may be used, such as depending upon the operating conditions under which device 10 is used.

Continuing the above illustration of exemplary frame members 230, permeate gaskets 236 and 236' are attached to permeate frame 232, preferably but not necessarily, by using another thin application of adhesive. Next, membranes 46 are supported against screen structure 210 and/or attached to screen structure 210 using a thin application of adhesive, such as by spraying or otherwise applying the adhesive to either or both of the membrane and/or screen structure. Care should be taken to ensure that the membranes are flat and firmly attached to the corresponding screen member 212. Feed plates, or gaskets, 238 and 238' are optionally attached to gaskets 236 and 236', such as by using another thin application of adhesive. The resulting membrane envelope 200 is then positioned within compartment 18, such as by a suitable mount 52. Optionally, two or more membrane envelopes may be stacked or otherwise supported together within compartment 18.

Figure 34:
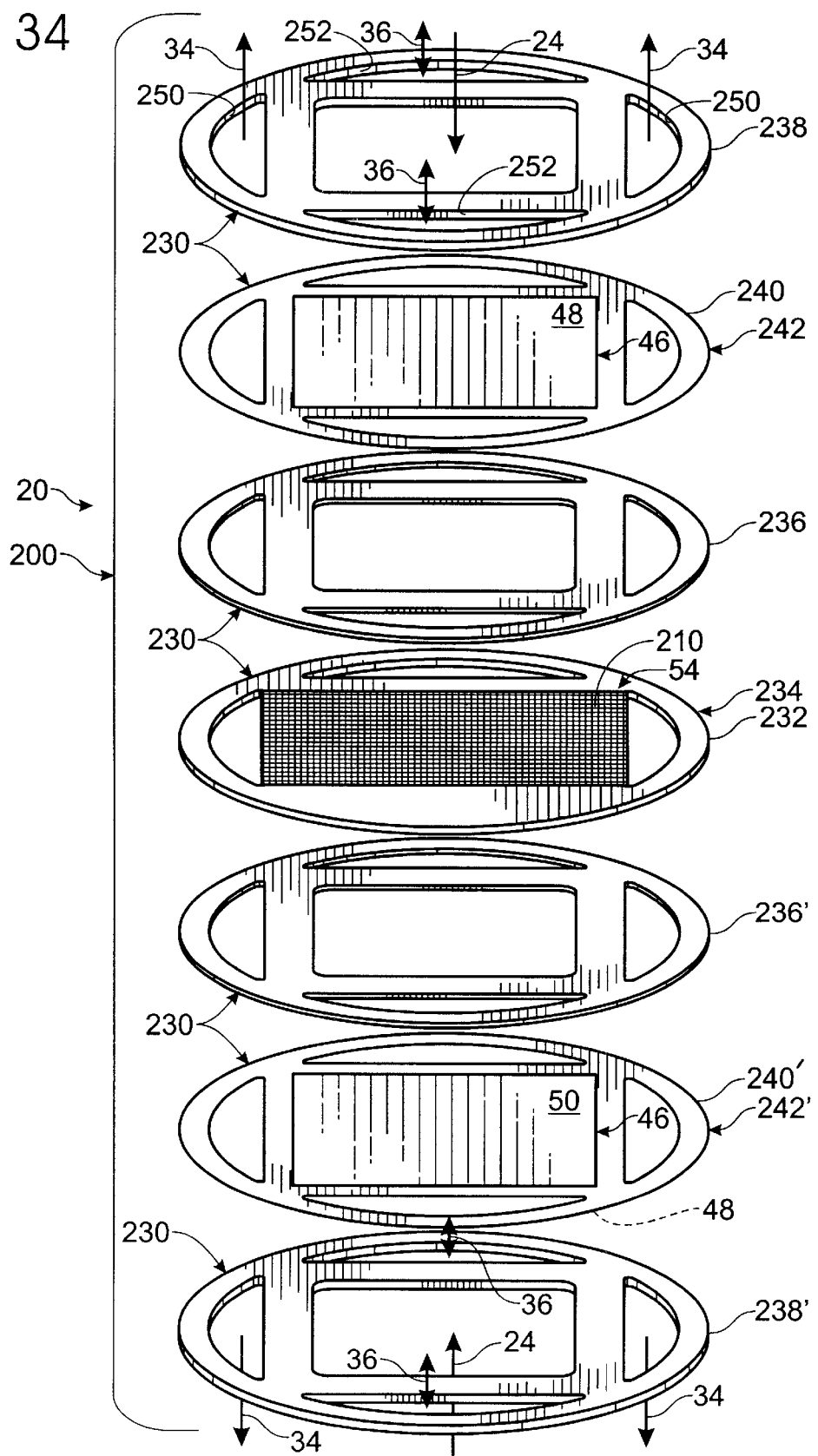
FIG. 34 is an exploded isometric view of another membrane envelope constructed according to the present invention.

As a further alternative, each membrane 46 may be fixed to a frame member 230, such as metal frames 240 and 240', as shown in FIG. 34. If so, the membrane is fixed to the frame, for instance by ultrasonic welding or another suitable attachment mechanism. The membrane-frame assembly may, but is not required to be, attached to screen structure 210 using adhesive. Other examples of attachment mechanisms that achieve gas-tight seals between plates forming membrane envelope 200, as well as between the membrane envelopes, include one or more of brazing, gasketing, and welding. The membrane and attached frame may collectively be referred to as a membrane plate, such as indicated at 242 and 242' in FIG. 34. It is within the scope of the invention that the various frames discussed herein do not all need to be formed from the same materials and/or that the frames may not have the same dimensions, such as the same thicknesses. For example, the permeate and feed frames may be formed from stainless steel or another suitable structural member, while the membrane plate may be formed from a different material, such as copper, alloys thereof, and other materials discussed in the above-incorporated patents and applications. Additionally and/or alternatively, the membrane plate may, but is not required to be, thinner than the feed and/or permeate plates.

For purposes of illustration, a suitable geometry of fluid flow through membrane envelope 200 is described with respect to the embodiment of envelope 200 shown in FIG. 33. As shown, mixed gas stream 24 is delivered to the membrane envelope and contacts the outer surfaces 50 of membranes 46. The hydrogen-rich gas that permeates through the membranes enters harvesting conduit 204. The harvesting conduit is in fluid communication with conduits 250 through which the permeate stream may be withdrawn from the membrane envelope. The portion of the mixed gas stream that does not pass through the membranes flows to a conduit 252 through which this gas may be withdrawn as byproduct stream 36. In FIG. 33, a single byproduct conduit 252 is shown, while in FIG. 34 a pair of conduits 252 are shown to illustrate that any of the conduits described herein may alternatively include more than one fluid passage. It should be understood that the arrows used to indicate the flow of streams 34 and 36 have been schematically illustrated, and that the direction of flow through conduits 250 and 252 may vary, such as depending upon the configuration of a particular membrane envelope 200, module 220 and/or device 10.

Figure 35:
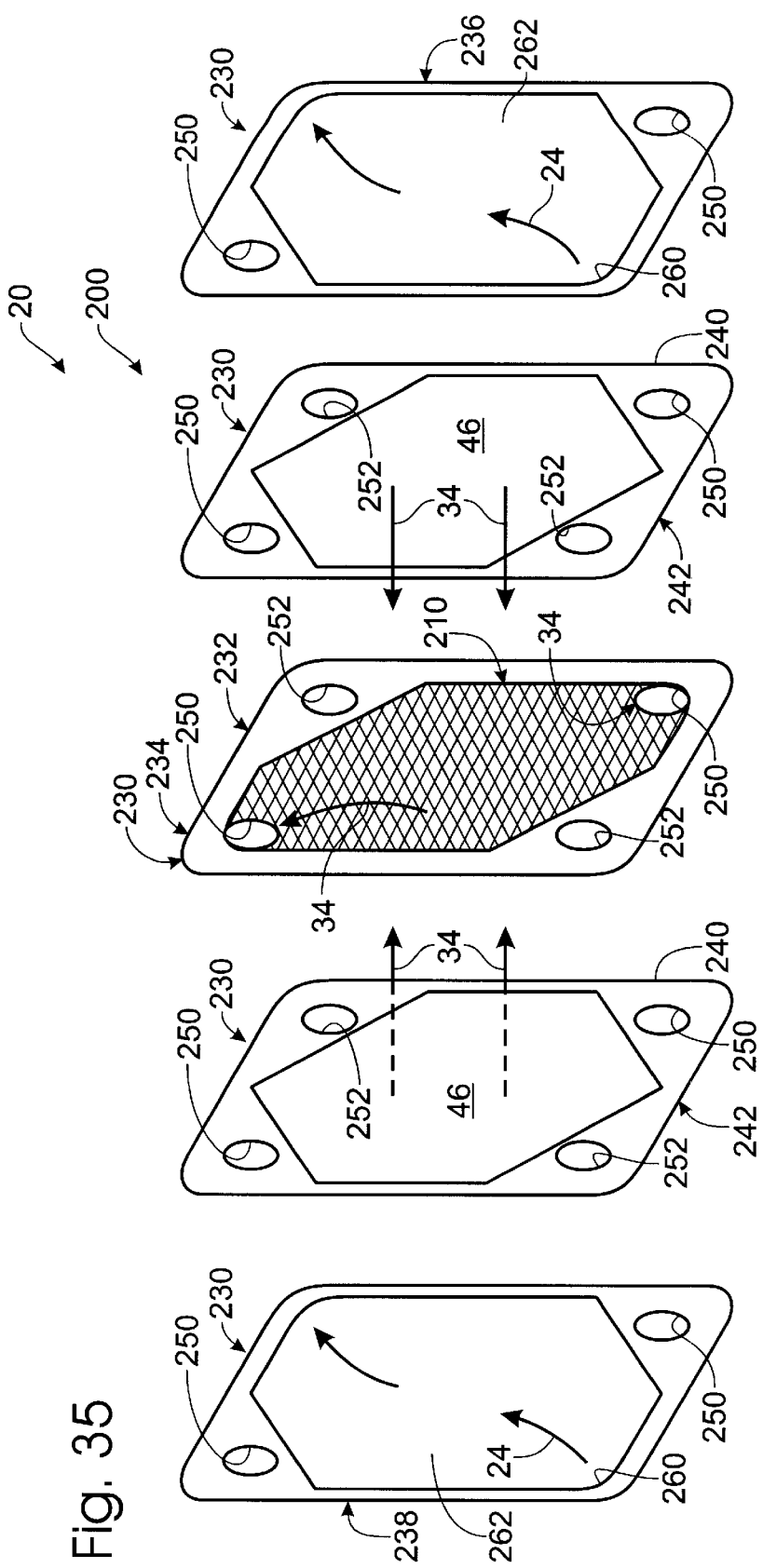
FIG. 35 is an exploded isometric view of another membrane envelope constructed according to the present invention.

In FIG. 35, another example of a suitable membrane envelope 200 is shown. To graphically illustrate that end plates 60 and shell 62 may have a variety of configurations, envelope 200 is shown having a generally rectangular configuration. The envelope of FIG. 35 also provides another example of a membrane envelope having a pair of byproduct conduits 252 and a pair of hydrogen conduits 250. As shown, envelope 200 includes feed, or spacer, plates 238 as the outer most frames in the envelope. Generally, each of plates 238 includes a frame 260 that defines an inner open region 262. Each inner open region 262 couples laterally to conduits 252. Conduits 250, however, are closed relative to open region 262, thereby isolating hydrogen-rich stream 34. Membrane plates 242 lie adjacent and interior to plates 238. Membrane plates 242 each include as a central portion thereof a hydrogen-selective membrane 46, which may be secured to an outer frame 240, which is shown for purposes of graphical illustration. In plates 242, all of the conduits are closed relative to membrane 46. Each membrane lies adjacent to a corresponding one of open regions 262, i.e., adjacent to the flow of mixed gas arriving to the envelope. This provides an opportunity for hydrogen gas to pass through the membrane, with the non-permeating gases, i.e., the gases forming byproduct stream 36, leaving open region 262 through conduit 252. Screen plate 234 is positioned intermediate membranes 46 and/or membrane plates 242, i.e., on the interior or permeate side of each of membranes 46. Screen plate 234 includes a screen structure 210 or another suitable support 54. Conduits 252 are closed relative to the central region of screen plate 234, thereby isolating the byproduct stream 36 and mixed gas stream 24 from hydrogen-rich stream 34. Conduits 250 are open to the interior region of screen plate 234. Hydrogen gas, having passed through the adjoining membranes 46, travels along and through screen structure 210 to conduits 250 and eventually to an output port as the hydrogen-rich stream 34.

Figure 36:
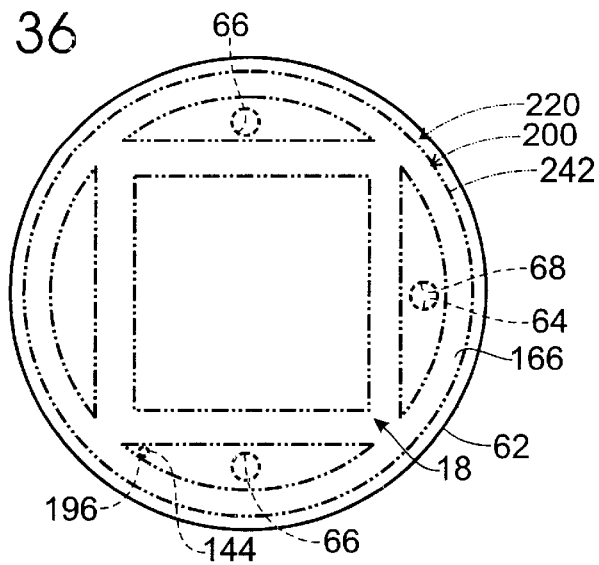
FIG. 36 is a cross-sectional view of a shell for an enclosure for a hydrogen purification device constructed according to the present invention with an illustrative membrane frame and membrane module shown in dashed lines.
Figure 37:
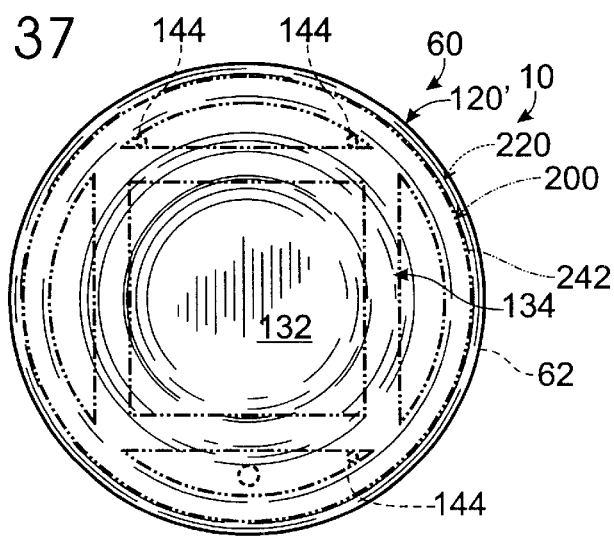
FIG. 37 is a top plan view of the end plate of FIG. 13 with an illustrative separation membrane and frame shown in dashed lines.
Figure 38:
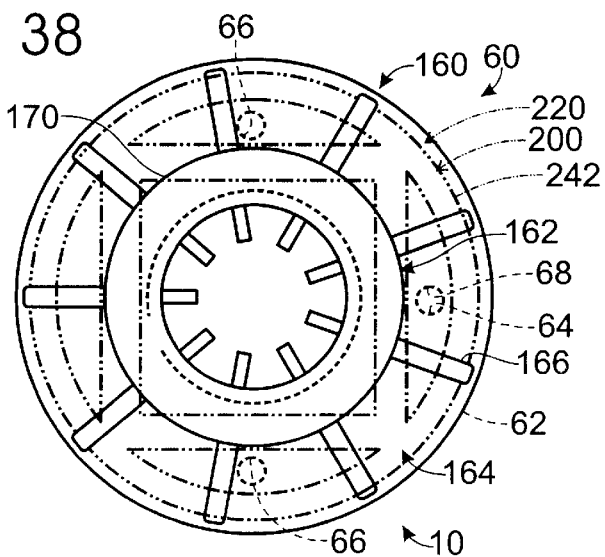
FIG. 38 is a top plan view of the end plate of FIG. 21 with an illustrative separation membrane and frame shown in dashed lines.

As discussed, device 10 may include a single membrane 46 within shell 62, a plurality of membranes within shell 62, one or more membrane envelopes 200 within shell 62 and/or other separation assemblies 20. In FIG. 36, a membrane envelope 200 similar to that shown in FIG. 34 is shown positioned within shell 62 to illustrate this point. It should be understood that envelope 200 may also schematically represent a membrane module 220 containing a plurality of membrane envelopes, and/or a single membrane plate 242. Also shown for purposes of illustration is an example of a suitable position for guide structures 144. As discussed, structures 144 also represent an example of internal supports 196. FIG. 36 also illustrates graphically an example of suitable positions for ports 64–68. To further illustrate suitable positions of the membrane plates and/or membrane envelopes within devices 10 containing end plates according to the present invention, FIGS. 37 and 38 respectively illustrate in dashed lines a membrane plate 242, membrane envelope 200 and/or membrane module 220 positioned within a device 10 that includes the end plates shown in FIGS. 13–14 and 21–25.

Figure 39:
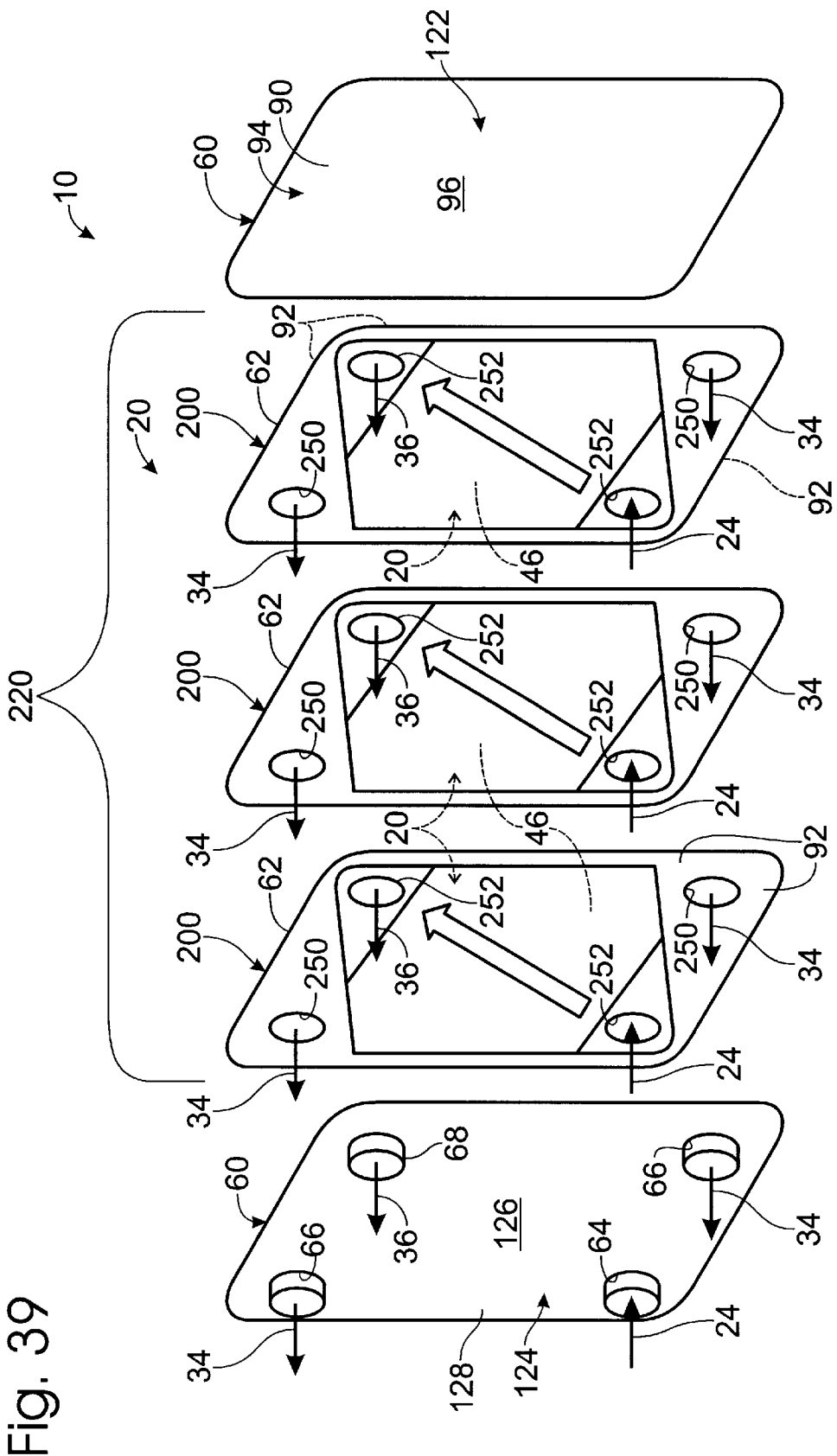
FIG. 39 is an exploded isometric view of another hydrogen purification device constructed according to the present invention.

Shell 62 has been described as interconnecting the end plates to define therewith internal compartment 18. It is within the scope of the invention that the shell may be formed from a plurality of interconnected plates 230. For example, a membrane module 220 that includes one or more membrane envelopes 200 may form shell 62 because the perimeter regions of each of the plates may form a fluid-tight, or at least substantially fluid-tight seal therebetween. An example of such a construction is shown in FIG. 39, in which a membrane module 220 that includes three membrane envelopes 200 is shown. It should be understood that the number of membrane envelopes may vary, from a single envelope or even a single membrane plate 242, to a dozen or more. In FIG. 39, end plates 60 are schematically represented as having generally rectangular configurations to illustrate that configurations other than circular configurations are within the scope of the invention. It should be understood that the schematically depicted end plates 60 may have any of the end plate configurations discussed, illustrated and/or incorporated herein.

In the preceding discussion, illustrative examples of suitable materials of construction and methods of fabrication for the components of hydrogen purification devices according to the present invention have been discussed. It should be understood that the examples are not meant to represent an exclusive, or closed, list of exemplary materials and methods, and that it is within the scope of the invention that other materials and/or methods may be used. For example, in many of the above examples, desirable characteristics or properties are presented to provide guidance for selecting additional methods and/or materials. This guidance is also meant as an illustrative aid, as opposed to reciting essential requirements for all embodiments.

As discussed, in embodiments of device 10 that include a separation assembly that includes hydrogen-permeable and/or hydrogen-selective membranes 46, suitable materials for membranes 46 include palladium and palladium alloys. As also discussed, the membranes may be supported by frames and/or supports, such as the previously described frames 240, supports 54 and screen structure 210. Furthermore, devices 10 are often operated at selected operating parameters that include elevated temperatures and pressures. In such an application, the devices typically begin at a startup, or initial, operating state, in which the devices are typically at ambient temperature and pressure, such as atmospheric pressure and a temperature of approximately 25° C. From this state, the device is heated (such as with heating assembly 42) and pressurized (via any suitable mechanism) to selected operating parameters, such as temperatures of 200° C. or more, and selected operating pressures, such as pressure of 50 psi or more.

When devices 10 are heated, the components of the devices will expand. The degree to which the components enlarge or expand is largely defined by the coefficient of thermal expansion (CTE) of the materials from which the components are formed. Accordingly, these differences in CTEs will tend to cause the components to expand at different rates, thereby placing additional tension or compression on some components and/or reduced tension or compression on others.

For example, consider a hydrogen-selective membrane 46 formed from an alloy of 60 wt % palladium and 40 wt % copper (Pd-40Cu). Such a membrane has a coefficient of thermal expansion of 13.4 ($\mu$m/m)/° C. Further consider that the membrane is secured to a structural frame 230 or retained against a support 54 formed from a material having a different CTE than Pd-40Cu or another material from which membrane 46 is formed. When a device 10 in which these components are operated is heated from an ambient or resting configuration, the components will expand at different rates. If the CTE of the membrane is less than the CTE of the adjoining structural component, then the membrane will tend to be stretched as the components are heated. In addition to this initial stretching, it should be considered that hydrogen purification devices typically experience thermal cycling as they are heated for use, then cooled or allowed to cool when not in use, then reheated, recooled, etc. In such an application, the stretched membrane may become wrinkled as it is compressed toward its original configuration as the membrane and other structural component(s) are cooled. On the other hand, if the CTE of the membrane is greater than the CTE of the adjoining structural component, then the membrane will tend to be compressed during heating of the device, and this compression may cause wrinkling of the membrane. During cooling, or as the components cool, the membrane is then drawn back to its original configuration.

Wrinkling of membrane 46 may cause holes and cracks in the membrane, especially along the wrinkles where the membrane is fatigued. In regions where two or more wrinkles intersect, the likelihood of holes and/or cracks is increased because that portion of the membrane has been wrinkled in at least two different directions. It should be understood that holes and cracks lessen the selectivity of the membrane for hydrogen gas because the holes and/or cracks are not selective for hydrogen gas and instead allow any of the components of the mixed gas stream to pass thereto. During repeated thermal cycling of the membrane, these points or regions of failure will tend to increase in size, thereby further decreasing the purity of the hydrogen-rich, or permeate, stream.

One approach to guarding against membrane failure due to differences in CTE between the membranes and adjoining structural components is to place deformable gaskets between the membrane and any component of device 10 that contacts the membrane and has sufficient stiffness or structure to impart compressive or tensile forces to the membrane that may wrinkle the membrane. For example, in FIG. 33, membrane 46 is shown sandwiched between feed plate 238 and permeate gasket 236, both of which may be formed from a deformable material. In such an embodiment and with such a construction, the deformable gaskets buffer, or absorb, at least a significant portion of the compressive or tensile forces that otherwise would be exerted upon membrane 46.

In embodiments where either or both of these frames are not formed from a deformable material (i.e., a resilient material that may be compressed or expanded as forces are imparted thereto and which returns to its original configuration upon removal of those forces), when membrane 46 is mounted on a plate 242 that has a thickness and/or composition that may exert the above-described wrinkling tensile or compressive forces to membrane 46, or when support 54 is bonded (or secured under the selected operating pressure) to membrane 46, a different approach may additionally or alternatively be used. More specifically, the life of the membranes may be increased by forming components of device 10 that otherwise would impart wrinkling forces, either tensile or compressive, to membrane 46 from materials having a CTE that is the same or similar to that of the material or materials from which membrane 46 is formed.

For example, Type 304 stainless steel has a CTE of 17.3 and Type 316 stainless steel has a CTE of 16.0. Accordingly, Type 304 stainless steel has a CTE that is approximately 30% greater than that of Pd-40Cu, and Type 316 stainless steel has a CTE that is approximately 20% greater than that of Pd-40Cu. This does not mean that these materials may not be used to form the various supports, frames, plates, shells and the like discussed herein. However, in some embodiments of the invention, it may be desirable to form at least some of these components form a material that has a CTE that is the same or similar to that of the material from which membrane 46 is formed. More specifically, it may be desirable to have a CTE that is the same as the CTE of the material from which membrane 46 is formed, or a material that has a CTE that is within a selected range of the CTE of the material from which membrane 46 is selected, such as within±1%, 2%, 5%, 10%, or 15%.

In the following table, exemplary alloys and their corresponding CTE's and compositions are presented.

TABLE 1

| Alloy Type/Grade | CTE (μm/m/C) | C | Mn | Ni | Cr | Co | Mo | W | Nb | Cu | Ti | Al | Fe | Si |
|---|---|---|---|---|---|---|---|---|---|---|---|---|---|---|
| Pd-40Cu | 13.4 | | | | | | | | | | | | | |
| Monel 400 (UNS N04400) | 13.9 | .02 | 1.5 | 65 | | | | | | 32 | | | 2.0 | |
| Monel 401 (UNS N04401) | 13.7 | .05 | 2.0 | 42 | | | | | | 54 | | | 0.5 | |
| Monel 405 (UNS N04405) | 13.7 | .02 | 1.5 | 65 | | | | | | 32 | | | 2.0 | |
| Monel 500 (UNS N05500) | 13.7 | .02 | 1.0 | 65 | | | | | | 32 | 0.6 | | 1.5 | |
| Type 304 Stainless (UNS S30400) | 17.3 | .05 | 1.5 | 9.0 | 19.0 | | | | | | | | Bal | 0.5 |
| Type 316 Stainless (UNS S31600) | 16.0 | .05 | 1.5 | 12.0 | 17.0 | | 2.5 | | | | | | Bal | 0.5 |
| Type 310S Stainless (UNS S31008) | 15.9 | .05 | 1.5 | 20.5 | 25.0 | | | | | | | | Bal | 1.1 |
| Type 330 Stainless (UNS N08330) | 14.4 | .05 | 1.5 | 35.5 | 18.5 | | | | | | | | Bal | 1.1 |
| AISI Type 661 Stainless (UNS R30155) | 14.0 | .1 | 1.5 | 20.0 | 21.0 | 20.5 | 3.0 | 2.5 | 1.0 | | | | 31.0 | 0.8 |
| Inconel 600 (UNS N06600) | 13.3 | .08 | | 76.0 | 15.5 | | | | | | | | 8.0 | |
| Inconel 601 (UNS N06601) | 13.75 | .05 | | 60.5 | 23.0 | | | | | 0.5 | | 1.35 | 14.1 | |
| Inconel 625 (UNS N06625) | 12.8 | .05 | | 61.0 | 21.5 | | 9.0 | | 3.6 | | 0.2 | 0.2 | 2.5 | |
| Incoloy 800 (UNS N08800) | 14.4 | .05 | 0.8 | 32.5 | | | | | | 0.4 | 0.4 | 0.4 | 46.0 | 0.5 |
| Nimonic Alloy 901 (UNS N09901) | 13.5 | .05 | | 42.5 | 12.5 | | 6.0 | | | | 2.7 | | 36.2 | |
| Hastelloy X (UNS N06002) | 13.3 | .15 | | 49.0 | 22.0 | 1.5 | 9.0 | 0.6 | | | | 2 | 15.8 | |
| Inconel 718 UNS N07718 | 13.0 | .05 | | 52.5 | 19.0 | | 3.0 | | 5.1 | | 0.9 | 0.5 | 18.5 | |
| Haynes 230 (UNS N06002 | 12.7 | 0.1 | | 55.0 | 22.0 | 5.0 | 2.0 | 14 | | | | 0.35 | 3.0 | |

From the above information, it can be seen that alloys such as Hastelloy X have a CTE that corresponds to that of Pd-40Cu, and that the Monel and Inconel 601 alloys have CTE's that are within approximately 1% of the CTE of Pd-40Cu. Of the illustrative example of materials listed in the table, all of the alloys other than Hastelloy F, Incoloy 800 and the Type 300 series of stainless steel alloys have CTE's that are within 2% of the CTE of Pd-40Cu, and all of the alloys except Type 304, 316 and 310S stainless steel alloys have CTE's that are within 5% of the CTE of Pd-40Cu.

Examples of components of device 10 that may be formed from a material having a selected CTE relative to membrane 46, such as a CTE corresponding to or within one of the selected ranges of the CTE of membrane 46, include one or more of the following: support 54, screen members 212, fine or outer screen or expanded metal member 216, inner screen member 214, membrane frame 240, permeate frame 232, permeate plate 234, feed plate 238. By the above, it should be understood that one of the above components may be formed from such a material, more than one of the above components may be formed from such a material, but that none of the above components are required to be formed from such a material. Similarly, the membranes 46 may be formed from materials other than Pd-40Cu, and as such the selected CTE's will vary depending upon the particular composition of membranes 46.

By way of further illustration, a device 10 may be formed with a membrane module 220 that includes one or more membrane envelopes 200 with a screen structure that is entirely formed from a material having one of the selected CTE's; only outer, or membrane-contacting, screen members (such as members 216) formed from a material having one of the selected CTE's and the inner member or members being formed from a material that does not have one of the selected CTE's; inner screen member 214 formed from a material having one of the selected CTE's, with the membrane-contacting members being formed from a material that does not have one of the selected CTE's, etc. By way of further illustration, a device 10 may have a single membrane 46 supported between the end plates 60 of the enclosure by one or more mounts 52 and/or one or more supports 54. The mounts and/or the supports may be formed from a material having one of the selected CTE's. Similarly, at least a portion of enclosure 12, such as one or both of end plates 60 or shell 62, may be formed from a material having one of the selected CTE's.

In embodiments of device 10 in which there are components of the device that do not directly contact membrane 46, these components may still be formed from a material having one of the selected CTE's. For example, a portion or all of enclosure 12, such as one or both of end plates 60 or shell 62, may be formed from a material, including one of the alloys listed in Table 1, having one of the selected CTE's relative to the CTE of the material from which membrane 46 is formed even though these portions do not directly contact membrane 46.

A hydrogen purification device 10 constructed according to the present invention may be coupled to, or in fluid communication with, any source of impure hydrogen gas. Examples of these sources include gas storage devices, such as hydride beds and pressurized tanks. Another source is an apparatus that produces as a byproduct, exhaust or waste stream a flow of gas from which hydrogen gas may be recovered. Still another source is a fuel processor, which as used herein, refers to any device that is adapted to produce a mixed gas stream containing hydrogen gas from at least one feed stream containing a feedstock. Typically, hydrogen gas will form a majority or at least a substantial portion of the mixed gas stream produced by a fuel processor.

A fuel processor may produce mixed gas stream 24 through a variety of mechanisms. Examples of suitable mechanisms include steam reforming and autothermal reforming, in which reforming catalysts are used to produce hydrogen gas from a feed stream containing a carbon-containing feedstock and water. Other suitable mechanisms for producing hydrogen gas include pyrolysis and catalytic partial oxidation of a carbon-containing feedstock, in which case the feed stream does not contain water. Still another suitable mechanism for producing hydrogen gas is electrolysis, in which case the feedstock is water. Examples of suitable carbon-containing feedstocks include at least one hydrocarbon or alcohol. Examples of suitable hydrocarbons include methane, propane, natural gas, diesel, kerosene, gasoline and the like. Examples of suitable alcohols include methanol, ethanol, and polyols, such as ethylene glycol and propylene glycol.

A hydrogen purification device 10 adapted to receive mixed gas stream 24 from a fuel processor is shown schematically in FIG. 40. As shown, the fuel processor is generally indicated at 300, and the combination of a fuel processor and a hydrogen purification device may be referred to as a fuel processing system 302. Also shown in dashed lines at 42 is a heating assembly, which as discussed provides heat to device 10 and may take a variety of forms. Fuel processor 300 may take any of the forms discussed above. To graphically illustrate that a hydrogen purification device according to the present invention may also receive mixed gas stream 24 from sources other than a fuel processor 300, a gas storage device is schematically illustrated at 306 and an apparatus that produces mixed gas stream 24 as a waste or byproduct stream in the course of producing a different product stream 308 is shown at 310. It should be understood that the schematic representation of fuel processor 300 is meant to include any associated heating assemblies, feedstock delivery systems, air delivery systems, feed stream sources or supplies, etc.

Fuel processors are often operated at elevated temperatures and/or pressures. As a result, it may be desirable to at least partially integrate hydrogen purification device 10 with fuel processor 300, as opposed to having device 10 and fuel processor 300 connected by external fluid transportation conduits. An example of such a configuration is shown in FIG. 42, in which the fuel processor includes a shell or housing 312, which device 10 forms a portion of and/or extends at least partially within. In such a configuration, fuel processor 300 may be described as including device 10. Integrating the fuel processor or other source of mixed gas stream 24 with hydrogen purification device 10 enables the devices to be more easily moved as a unit. It also enables the fuel processor's components, including device 10, to be heated by a common heating assembly and/or for at least some if not all of the heating requirements of device 10 be to satisfied by heat generated by processor 300.

As discussed, fuel processor 300 is any suitable device that produces a mixed gas stream containing hydrogen gas, and preferably a mixed gas stream that contains a majority of hydrogen gas. For purposes of illustration, the following discussion will describe fuel processor 300 as being adapted to receive a feed stream 316 containing a carbon-containing feedstock 318 and water 320, as shown in FIG. 42. However, it is within the scope of the invention that the fuel processor 300 may take other forms, as discussed above, and that feed stream 316 may have other compositions, such as containing only a carbon-containing feedstock or only water.

Feed stream 316 may be delivered to fuel processor 300 via any suitable mechanism. A single feed stream 316 is shown in FIG. 42, but it should be understood that more than one stream 316 may be used and that these streams may contain the same or different components. When the carbon-containing feedstock 318 is miscible with water, the feedstock is typically delivered with the water component of feed stream 316, such as shown in FIG. 42. When the carbon-containing feedstock is immiscible or only slightly miscible with water, these components are typically delivered to fuel processor 300 in separate streams, such as shown in dashed lines in FIG. 42. In FIG. 42, feed stream 316 is shown being delivered to fuel processor 300 by a feed stream delivery system 317. Delivery system 317 includes any suitable mechanism, device, or combination thereof that delivers the feed stream to fuel processor 300. For example, the delivery system may include one or more pumps that deliver the components of stream 316 from a supply. Additionally, or alternatively, system 317 may include a valve assembly adapted to regulate the flow of the components from a pressurized supply. The supplies may be located external of the fuel cell system, or may be contained within or adjacent the system.

As generally indicated at 332 in FIG. 42, fuel processor 300 includes a hydrogen-producing region in which mixed gas stream 24 is produced from feed stream 316. As discussed, a variety of different processes may be utilized in hydrogen-producing region 332. An example of such a process is steam reforming, in which region 332 includes a steam reforming catalyst 334. Alternatively, region 332 may produce stream 24 by autothermal reforming, in which case region 332 includes an autothermal reforming catalyst. In the context of a steam or autothermal reformer, mixed gas stream 24 may also be referred to as a reformate stream. Preferably, the fuel processor is adapted to produce substantially pure hydrogen gas, and even more preferably, the fuel processor is adapted to produce pure hydrogen gas. For the purposes of the present invention, substantially pure hydrogen gas is greater than 90% pure, preferably greater than 95% pure, more preferably greater than 99% pure, and even more preferably greater than 99.5% pure. Examples of suitable fuel processors are disclosed in U.S. Pat. No. 6,221,117, pending U.S. patent application Ser. No. 09/802,361, which was filed on Mar. 8, 2001, and is entitled "Fuel Processor and Systems and Devices Containing the Same," and pending U.S. patent application Ser. No. 09/812,499, which was filed on Mar. 19, 2001, and is entitled "Hydrogen-Selective Metal Membrane Modules and Method of Forming the Same," each of which is incorporated by reference in its entirety for all purposes.

Fuel processor 300 may, but does not necessarily, further include a polishing region 348, such as shown in dashed lines in FIG. 42. Polishing region 348 receives hydrogen-rich stream 34 from device 10 and further purifies the stream by reducing the concentration of, or removing, selected compositions therein. In FIG. 42, the resulting stream is indicated at 314 and may be referred to as a product hydrogen stream or purified hydrogen stream. When fuel processor 300 does not include polishing region 348, hydrogen-rich stream 34 forms product hydrogen stream 314. For example, when stream 34 is intended for use in a fuel cell stack, compositions that may damage the fuel cell stack, such as carbon monoxide and carbon dioxide, may be removed from the hydrogen-rich stream, if necessary. The concentration of carbon monoxide should be less than 10 ppm (parts per million) to prevent the control system from isolating the fuel cell stack. Preferably, the system limits the concentration of carbon monoxide to less than 5 ppm, and even more preferably, to less than 1 ppm. The concentration of carbon dioxide may be greater than that of carbon monoxide. For example, concentrations of less than 25% carbon dioxide may be acceptable. Preferably, the concentration is less than 10%, even more preferably, less than 1%. Especially preferred concentrations are less than 50 ppm. It should be understood that the acceptable minimum concentrations presented herein are illustrative examples, and that concentrations other than those presented herein may be used and are within the scope of the present invention. For example, particular users or manufacturers may require minimum or maximum concentration levels or ranges that are different than those identified herein.

Region 348 includes any suitable structure for removing or reducing the concentration of the selected compositions in stream 34. For example, when the product stream is intended for use in a PEM fuel cell stack or other device that will be damaged if the stream contains more than determined concentrations of carbon monoxide or carbon dioxide, it may be desirable to include at least one methanation catalyst bed 350. Bed 350 converts carbon monoxide and carbon dioxide into methane and water, both of which will not damage a PEM fuel cell stack. Polishing region 348 may also include another hydrogen-producing region 352, such as another reforming catalyst bed, to convert any unreacted feedstock into hydrogen gas. In such an embodiment, it is preferable that the second reforming catalyst bed is upstream from the methanation catalyst bed so as not to reintroduce carbon dioxide or carbon monoxide downstream of the methanation catalyst bed.

Steam reformers typically operate at temperatures in the range of 200° C. and 700° C. and at pressures in the range of 50 psi and 1000 psi, although temperatures outside of this range are within the scope of the invention, such as depending upon the particular type and configuration of fuel processor being used. Any suitable heating mechanism or device may be used to provide this heat, such as a heater, burner, combustion catalyst, or the like. The heating assembly may be external the fuel processor or may form a combustion chamber that forms part of the fuel processor. The fuel for the heating assembly may be provided by the fuel processing or fuel cell system, by an external source, or both.

In FIG. 42, fuel processor 300 is shown including a shell 312 in which the above-described components are contained. Shell 312, which also may be referred to as a housing, enables the components of the fuel processor to be moved as a unit. It also protects the components of the fuel processor from damage by providing a protective enclosure and reduces the heating demand of the fuel processor because the components of the fuel processor may be heated as a unit. Shell 312 may, but does not necessarily, include insulating material 333, such as a solid insulating material, blanket insulating material, or an air-filled cavity. It is within the scope of the invention, however, that the fuel processor may be formed without a housing or shell. When fuel processor 300 includes insulating material 333, the insulating material may be internal the shell, external the shell, or both. When the insulating material is external a shell containing the above-described reforming, separation and/or polishing regions, the fuel processor may further include an outer cover or jacket external the insulation.

It is further within the scope of the invention that one or more of the components of fuel processor 300 may either extend beyond the shell or be located external at least shell 312. For example, device 10 may extend at least partially beyond shell 312, as indicated in FIG. 41. As another example, and as schematically illustrated in FIG. 42, polishing region 348 may be external shell 312 and/or a portion of hydrogen-producing region 332 (such as portions of one or more reforming catalyst beds) may extend beyond the shell.

As indicated above, fuel processor 300 may be adapted to deliver hydrogen-rich stream 34 or product hydrogen stream 314 to at least one fuel cell stack, which produces an electric current therefrom. In such a configuration, the fuel processor and fuel cell stack may be referred to as a fuel cell system. An example of such a system is schematically illustrated in FIG. 43, in which a fuel cell stack is generally indicated at 322. The fuel cell stack is adapted to produce an electric current from the portion of product hydrogen stream 314 delivered thereto. In the illustrated embodiment, a single fuel processor 300 and a single fuel cell stack 322 are shown and described, however, it should be understood that more than one of either or both of these components may be used. It should also be understood that these components have been schematically illustrated and that the fuel cell system may include additional components that are not specifically illustrated in the figures, such as feed pumps, air delivery systems, heat exchangers, heating assemblies and the like.

Fuel cell stack 322 contains at least one, and typically multiple, fuel cells 324 that are adapted to produce an electric current from the portion of the product hydrogen stream 314 delivered thereto. This electric current may be used to satisfy the energy demands, or applied load, of an associated energy-consuming device 325. Illustrative examples of devices 325 include, but should not be limited to, a motor vehicle, recreational vehicle, boat, tools, lights or lighting assemblies, appliances (such as household or other appliances), household, signaling or communication equipment, etc. It should be understood that device 325 is schematically illustrated in FIG. 43 and is meant to represent one or more devices or collection of devices that are adapted to draw electric current from the fuel cell system. A fuel cell stack typically includes multiple fuel cells joined together between common end plates 323, which contain fluid delivery/removal conduits (not shown). Examples of suitable fuel cells include proton exchange membrane (PEM) fuel cells and alkaline fuel cells. Fuel cell stack 322 may receive all of product hydrogen stream 314. Some or all of stream 314 may additionally, or alternatively, be delivered, via a suitable conduit, for use in another hydrogen-consuming process, burned for fuel or heat, or stored for later use.

INDUSTRIAL APPLICABILITY

The invented hydrogen purification devices, components and fuel processing systems are applicable to the fuel processing and other industries in which hydrogen gas is produced and/or utilized.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A hydrogen purification device, comprising:
   an enclosure having a pair of spaced-apart end plates and a perimeter shell extending therebetween to define with the end plates an internal compartment; wherein the enclosure includes at least one input port through which a mixed gas stream containing hydrogen gas is delivered to the enclosure, at least one product output port through which a permeate stream containing at least substantially pure hydrogen gas is removed from the enclosure, and at least one byproduct output port through which a byproduct stream containing at least a substantial portion of the other gases is removed from the enclosure;
   at least one hydrogen-selective membrane within the compartment, wherein the at least one hydrogen-selective membrane includes a first surface adapted to be contacted by the mixed gas stream and a permeate surface generally opposed to the first surface, wherein the permeate stream is formed from the portion of the mixed gas stream that passes through the at least one hydrogen-selective membrane to the permeate surface, and the byproduct stream is formed from the portion of the mixed gas stream that does not pass through the at least one hydrogen-selective membrane;
   wherein each of the end plates includes an interior surface that generally faces the compartment, an exterior surface that generally faces away from the enclosure, and a sealing region that forms at least a portion of a seal with the perimeter shell; and
   wherein at least one of the end plates includes a base plate containing the sealing region and a truss assembly projecting from the base plate.

2. The device of claim 1, wherein the truss assembly is adapted to support the at least one end plate against deflection away from the perimeter shell.

3. The device of claim 1, wherein the truss assembly is adapted to increase the heat transfer surface of the at least one end plate.

4. The device of claim 1, wherein the truss assembly is adapted to support the base plate of the at least one end plate against stresses imparted thereto.

5. The device of claim 1, wherein the truss assembly includes a plurality of ribs that extend from the base plate.

6. The device of claim 5, wherein the truss assembly includes a support interconnecting the ribs distal the base plate.

7. The device of claim 6, wherein the support extends generally parallel to the base plate.

8. The device of claim 5, wherein the truss assembly further includes a plurality of fins extending between the ribs and the base plate.

9. The device of claim 1, wherein the truss assembly extends from the interior surface of the at least one end plate.

10. The device of claim 1, wherein the truss assembly extends from the exterior surface of the at least one end plate.

11. The device of claim 1, wherein both of the end plates include a truss assembly extending therefrom.

12. The device of claim 1, wherein at least a portion of the shell is integrally formed with at least one of the end plates.

13. The device of claim 1, wherein each of the end plates includes a portion of the shell extending integrally therefrom.

14. The device of claim 1, wherein the base plate of the at least one end plate is adapted to receive stresses of less than 12,000 psi when the device is operated at a selected temperature of at least 200° C. and a selected pressure of at least 50 psi.

15. The device of claim 14, wherein the base plate of the at least one end plate has a cross-sectional area of at least 10 in$^2$.

16. The device of claim 14, wherein the base plate of the at least one end plate has a cross-sectional area of at least 20 in$^2$.

17. The device of claim 16, wherein the base plate of the at least one end plate has a mass of less than 5 pounds.

18. The device of claim 1, wherein the base plate of the at least one end plate is adapted to receive stresses of less than 12,000 psi when the device is operated at a selected temperature of at least 300° C. and a selected pressure of at least 125 psi.

19. The device of claim 1, wherein the base plate of the at least one end plate is adapted to receive stresses of less than 12,000 psi when the device is operated at a selected temperature of at least 400° C. and a selected pressure of at least 175 psi.

20. The device of claim 1, wherein the at least one end plate weights less than 4 pounds.

21. The device of claim 20, wherein the at least one end plate further has a cross-sectional area of at least 10 in².

22. The device of claim 21, wherein the at least one end plate further has a cross-sectional area of at least 15 in².

23. The device of claim 1, wherein the at least one end plate weighs less than 5 pounds, and further wherein the base plate of the at least one end plate is adapted to receive stresses of less than 12,000 psi when the device is operated at a selected temperature of at least 200° C. and a selected pressure of at least 50 psi.

24. The device of claim 1, wherein the at least one end plate weights less than 4 pounds, and further wherein the base plate of the at least one end plate is adapted to receive stresses of less then 12,000 psi when the device is operated at a selected temperature of at least 300° C. and a selected pressure of at least 100 psi.

25. The device of claim 24, wherein the base plate of the at least one end plate has a cross-sectional area of at least 10 in².

26. The device of claim 25, wherein the base plate of the at least one end plate has a cross-sectional area of at least 20 in².

27. The device of claim 1, wherein the base plate of the at least one end plate has a mass of less than 5 pounds.

28. The device of claim 1, wherein the device has a first configuration at a temperature of 25° C. and a pressure within the compartment of 1 atm, and a second configuration at a temperature of 400° C. and a pressure within the compartment of 175 psi, and further wherein in the second configuration, the base plate of the at least one end plate is adapted to have a maximum displacement from the first configuration of less than 0.001 inches.

29. The device of claim 1, wherein the device has a first configuration at a temperature of 25° C. and a pressure within the compartment of 1 atm, and a second configuration at a temperature of 400° C. and a pressure within the compartment of 175 psi, and further wherein in the second configuration, the base plate of the at least one end plate is adapted to have a maximum displacement from the first configuration of less than 0.0008 inches.

30. The device of claim 29, wherein the base plate of the at least one end plate has a cross-sectional area of at least 10 in².

31. The device of claim 30, wherein the base plate of the at least one end plate has a cross-sectional area of at least 20 in².

32. The device of claim 31, wherein the base plate of the at least one end plate has a mass of less than 5 pounds.

33. The device of claim 1, wherein the device has a first configuration at a temperature of 25° C. and a pressure within the compartment of 1 atm, and a second configuration at a temperature of 400° C. and a pressure within the compartment of 175 psi, and further wherein in the second configuration, the base plate of the at least one end plate is adapted to have a maximum displacement from the first configuration of less than 0.00065 inches.

34. The device of claim 1, wherein the device has a first configuration at a temperature of 25° C. and a pressure within the compartment of 1 atm, and a second configuration at a temperature of 400° C. and a pressure within the compartment of 175 psi, and further wherein in the second configuration, the base plate of the at least one end plate is adapted to have a displacement at its sealing region of less than 0.001 inches compared to the first configuration.

35. The device of claim 1, wherein the device has a first configuration at a temperature of 25° C. and a pressure within the compartment of 1 atm, and a second configuration at a temperature of 400° C. and a pressure within the compartment of 175 psi, and further wherein in the second configuration, the base plate of the at least one end plate is adapted to have a displacement at its sealing region of less than 0.0008 inches compared to the first configuration.

36. The device of claim 1, wherein the base plate of the at least one end plate has a cross-sectional area of at least 10 in².

37. The device of claim 36, wherein the base plate of the at least one end plate has a cross-sectional area of at least 20 in².

38. The device of claim 37, wherein the base plate of the at least one end plate has a mass of less than 5 pounds.

39. The device of claim 1, wherein the device has a first configuration at a temperature of 25° C. and a pressure within the compartment of 1 atm, and a second configuration at a temperature of 400° C. and a pressure within the compartment of 175 psi, and further wherein in the second configuration, the base plate of the at least one end plate is adapted to have a displacement at its sealing region of less than 0.0006 inches compared to the first configuration.

40. The device of claim 1, wherein the at least one end plate further has a cross-sectional area of at least 10 in².

41. The device of claim 40, wherein the at least one end plate further has a cross-sectional area of at least 20 in².

42. The device of claim 1, wherein the at least one end plate has a maximum displacement measured relative to a configuration of the at least one end plate at a temperature of 25° C. and a pressure of 1 atm, and further wherein the at least one end plate has a mass/maximum displacement ratio of less than 1000 lb/psi when the device is operated at a selected temperature of at least 200° C. and a selected pressure of at least 50 psi.

43. The device of claim 1, wherein the at least one end plate has a maximum displacement measured relative to a configuration of the at least one end plate at a temperature of 25° C. and a pressure of 1 atm, and further wherein the at least one end plate has a mass/maximum displacement ratio of less than 800 lb/psi when the device is operated at a selected temperature of at least 200° C. and a selected pressure of at least 50 psi.

44. The device of claim 1, wherein the at least one end plate has a maximum displacement measured relative to a configuration of the at least one end plate at a temperature of 25° C. and a pressure of 1 atn, and further wherein the at least one end plate has a mass/maximum displacement ratio of less than 600 lb/psi when the device is operated at a selected temperature of at least 200° C. and a selected pressure of at least 50 psi.

45. The device of claim 1, wherein the at least one end plate has a maximum displacement measured relative to a configuration of the at least one end plate at a temperature of 25° C. and a pressure of 1 atm, and further wherein the at least one end plate has a mass/maximum displacement ratio of less than 800 lb/psi when the device is operated at a selected temperature of at least 300° C. and a selected pressure of at least 125 psi.

46. The device of claim 45, wherein the base plate of the at least one end plate has a thickness of less than ⅓ inch.

47. The device of claim 46, wherein the base plate of the at least one end plate has a cross-sectional area of at least 10 in$^2$.

48. The device of claim 47, wherein the base plate of the at least one end plate has a cross-sectional area of at least 20 in$^2$.

49. The device of claim 1, wherein the at least one end plate has a maximum displacement measured relative to a configuration of the at least one end plate at a temperature of 25° C. and a pressure of 1 atm, and further wherein the at least one end plate has a mass/maximum displacement ratio of less than 600 lb/psi when the device is operated at a selected temperature of at least 300° C. and a selected pressure of at least 125 psi.

50. The device of claim 1, wherein the at least one end plate has a maximum displacement measured relative to a configuration of the at least one end plate at a temperature of 25° C. and a pressure of 1 atm, and further wherein the at least one end plate has a mass/maximum displacement ratio of less than 600 lb/psi when the device is operated at a selected temperature of at least 400° C. and a selected pressure of at least 175 psi.

51. The device of claim 1, wherein the at least one hydrogen-selective membrane has a generally tubular configuration.

52. The device of claim 1, wherein the at least one hydrogen-selective membrane has a generally planar configuration.

53. The device of claim 1, wherein the at least one hydrogen-selective membrane is mounted on a frame.

54. The device of claim 53, wherein the frame is housed within the shell.

55. The device of claim 54, wherein the frame forms at least a portion of the shell.

56. The device of claim 1, wherein the device includes at least one membrane envelope formed from a pair of hydrogen-selective membranes oriented such that the pair of hydrogen-selective membranes are spaced-apart from each other with their permeate surfaces generally facing each other to define a harvesting conduit extending therebetween, and further wherein the permeate stream is formed from the portion of the mixed gas stream that passes through the membranes to the harvesting conduit, with the remaining portion of the mixed gas stream which remains on the first surface of the membranes forming at least a portion of the byproduct stream.

57. The device of claim 56, wherein the at least one membrane envelope includes a support within the harvesting conduit and adapted to support the pair of hydrogen-selective membranes, wherein the support includes a pair of generally opposed surfaces which are adapted to provide support to a respective one of the permeate sides of the pair of hydrogen-selective membranes.

58. The device of claim 57, wherein the support engages but is not bonded to the pair of hydrogen-selective membranes.

59. The device of claim 57, wherein the support is formed from a porous material.

60. The device of claim 57, wherein the support is adapted to permit flow of gas both parallel and transverse to the permeate sides of the membranes.

61. The device of claim 57, wherein the pair of hydrogen-selective membranes are adhesively bonded to the support.

62. The device of claim 57, wherein the support includes at least one expanded metal screen.

63. The device of claim 57, wherein the support includes at least one mesh screen.

64. The device of claim 57, wherein the support includes a plurality of screen structures.

65. The device of claim 64, wherein the plurality of screen structures include an inner screen with outer screens separating the inner screen and the permeate sides of the membranes.

66. The device of claim 65, wherein the inner screen is coarser than the outer screens.

67. The device of claim 65, wherein the plurality of screen structures are adhesively bonded together.

68. The device of claim 56, wherein the hydrogen purification device includes a plurality of gas transport conduits interconnecting the at least one membrane envelope to selectively deliver the mixed gas stream to the first surfaces of the membranes, remove the permeate stream from the harvesting conduit, and remove the byproduct stream.

69. The device of claim 56, wherein the hydrogen purification device includes a plurality of membrane envelopes.

70. The device of claim 1, wherein the at least one hydrogen-selective membrane is formed from at least one of palladium and a palladium alloy.

71. The device of claim 1, in combination with a fuel cell stack adapted to receive at least a portion of the permeate stream.

72. The device of claim 71, in combination with a fuel processor adapted to produce the mixed gas stream.

73. The device of claim 72, wherein the fuel processor includes at least one reforming catalyst bed and is adapted to produce the mixed gas stream by steam reforming.

74. The device of claim 73, in further combination with a fuel cell stack adapted to receive at least a portion of the permeate stream and to produce an electric current therefrom.

75. The device of claim 74, in further combination with at least one electrical energy consuming device adapted to draw at least a portion of the electric current produced by the fuel cell stack.

76. A hydrogen purification device, comprising:
an enclosure defining an internal compartment; wherein the enclosure includes at least one input port through which a mixed gas stream containing hydrogen gas is delivered to the enclosure, at least one product output port through which a product hydrogen stream containing at least substantially pure hydrogen gas is removed from the enclosure, and at least one byproduct output port through which a byproduct stream containing at least a substantial portion of the other gases is removed from the enclosure;
at least one hydrogen-selective membrane within the compartment, wherein the at least one hydrogen-selective membrane includes a first surface adapted to be contacted by the mixed gas stream and a permeate surface generally opposed to the first surface, wherein the product stream is formed from the portion of the mixed gas stream that passes through the at least one hydrogen-selective membrane to the permeate surface, and the byproduct stream is formed from the portion of the mixed gas stream that does not pass through the at least one hydrogen-selective membrane; and
wherein the enclosure includes a pair of end plates and a shell portion that extends at least partially between the end plates to define at least a portion of the enclosure, and further wherein the shell portion is integrally formed with at least one of the end plates.

77. The device of claim 76, wherein the shell portion is integrally formed with a first one of the pair of end plates and includes an end portion distal the first one of the end plates that is adapted to form an at least substantially fluid-tight interface with a sealing region on a second one of the end plates.

78. The device of claim 77, wherein the sealing region extends around a perimeter region of the second one of the end plates.

79. The device of claim 76, wherein the shell portion is a first shell portion that is integrally formed with a first one of the pair of end plates, wherein the enclosure further includes a second shell portion that is integrally formed with a second one of the end plates.

80. The device of claim 79, wherein the shell portions include end regions that are adapted to collectively form an at least substantially fluid-tight interface.

81. The device of claim 80, wherein the device further includes a fastening mechanism adapted to seal the interface.

82. The device of claim 80, wherein the device further includes at least one seal member extending between the end regions.

83. The device of claim 76, wherein the enclosure includes only a single interface between the end plates and shell.

84. The device of claim 76, wherein the at least one hydrogen-selective membrane has a generally tubular configuration.

85. The device of claim 76, wherein the at least one hydrogen-selective membrane has a generally planar configuration.

86. The device of claim 76, further including at least one membrane envelope formed from a pair of hydrogen-selective membranes oriented such that the pair of hydrogen-selective membranes are spaced-apart from each other with their permeate sides generally facing each other to define a harvesting conduit extending therebetween, and further wherein the product hydrogen stream is formed from the portion of the mixed gas stream that passes through the membranes to the harvesting conduit, with the remaining portion of the mixed gas stream which remains on the first surface of the membranes forming at least a portion of the byproduct stream.

87. The device of claim 86, wherein the at least one membrane envelope includes a support within the harvesting conduit and adapted to support the pair of hydrogen-selective membranes, wherein the support includes a pair of generally opposed surfaces which are adapted to provide support to a respective one of the permeate sides of the pair of hydrogen-selective membranes.

88. The device of claim 76, in combination with a fuel cell stack adapted to receive at least a portion of the product hydrogen stream.

89. The device of claim 76, in combination with a fuel processor adapted to produce the mixed gas stream.

90. The device of claim 89, wherein the fuel processor includes at least one reforming catalyst bed and is adapted to produce the mixed gas stream by steam reforming.

91. In a hydrogen purification device that is adapted to be operated at a selected temperature of at least 200° C. and a selected pressure of at least 50 psi and which includes an enclosure with an internal, at least substantially fluid-fight compartment containing at least one hydrogen-selective membrane, the improvement comprising: at least one truss-stiffened end plate forming a portion of the enclosure.

92. The device of claim 91, wherein the selected temperature is at least 300° C. and the selected pressure is at least 150 psi.

93. The device of claim 91, in combination with a fuel processor that is adapted to produce a mixed gas stream containing hydrogen gas and to deliver at least a portion of the mixed gas stream to the hydrogen purification device.

94. The device of claim 93, wherein the device is at least partially housed within the fuel processor.

* * * * *

UNITED STATES PATENT AND TRADEMARK OFFICE
CERTIFICATE OF CORRECTION

PATENT NO. : 6,494,937 B1
DATED : December 17, 2002
INVENTOR(S) : David J. Edlund et al.

It is certified that error appears in the above-identified patent and that said Letters Patent is hereby corrected as shown below:

Column 38,
Line 22, after "substantially" please delete "fluid-fight" and insert -- fluid-tight -- therefor.

Signed and Sealed this

Sixth Day of May, 2003

JAMES E. ROGAN
*Director of the United States Patent and Trademark Office*